US012561967B2

(12) United States Patent
Kim et al.

(10) Patent No.: US 12,561,967 B2
(45) Date of Patent: Feb. 24, 2026

(54) IMAGE PROCESSING METHOD USING ARTIFICIAL NEURAL NETWORK, AND NEURAL PROCESSING UNIT

(71) Applicant: DEEPX CO., LTD., Seongnam-si (KR)

(72) Inventors: Lok Won Kim, Seongnam-si (KR); Shin Woo Jeon, Seoul (KR)

(73) Assignee: DEEPX CO., LTD., Seongnam-si (KR)

( * ) Notice: Subject to any disclaimer, the term of this patent is extended or adjusted under 35 U.S.C. 154(b) by 123 days.

(21) Appl. No.: 18/267,095

(22) PCT Filed: Jul. 1, 2022

(86) PCT No.: PCT/KR2022/009556
§ 371 (c)(1),
(2) Date: Jun. 13, 2023

(87) PCT Pub. No.: WO2023/277663
PCT Pub. Date: Jan. 5, 2023

(65) Prior Publication Data
US 2024/0104912 A1 Mar. 28, 2024

(30) Foreign Application Priority Data
Jul. 1, 2021 (KR) ........................ 10-2021-0086357

(51) Int. Cl.
G06V 10/00 (2022.01)
G06V 10/70 (2022.01)
G06V 10/82 (2022.01)
(52) U.S. Cl.
CPC .............. *G06V 10/82* (2022.01); *G06V 10/87* (2022.01)
(58) Field of Classification Search
CPC ........ G06V 10/82; G06V 10/87; G06V 10/25; G06V 10/764; G06V 10/955;
(Continued)

(56) References Cited

U.S. PATENT DOCUMENTS

2016/0127653 A1 5/2016 Lee et al.
2019/0294931 A1* 9/2019 Risser .................. G06T 3/4046
(Continued)

FOREIGN PATENT DOCUMENTS

CN 104463207 B * 8/2017 .............. G06N 3/08
KR 10-2018-0051367 A 5/2018
(Continued)

OTHER PUBLICATIONS

Zhang et al, An approach of region of interest detection based on visual attention and gaze tracking, 2012 IEEE International Conference on Signal Processing, Communication and Computing (ICSPCC) (Year: 2012).*

(Continued)

*Primary Examiner* — Xiao Liu
(74) *Attorney, Agent, or Firm* — INVENSTONE PATENT, LLC

(57) ABSTRACT

An image processing method includes receiving an image including an object; classifying at least one object in the image using a first model on the basis of an artificial neural network configured to classify the at least one object by inputting the image; and obtaining an image having improved quality according to the at least one object by inputting the image in which the at least one object is classified by using at least one model among a plurality of second models on the basis of an artificial neural network configured to output a specialized processing applied image according to a particular object by inputting the received image.

17 Claims, 15 Drawing Sheets

(58) Field of Classification Search
CPC .. G06V 10/993; G06V 20/20; G06F 18/2413;
G06N 3/04; G06N 3/08; G06N 3/045;
G06T 3/4046; G06T 5/00; G06T 7/11;
G06T 2207/20081; G06T 2207/20084
See application file for complete search history.

(56) References Cited

U.S. PATENT DOCUMENTS

| | | | |
|---|---|---|---|
| 2021/0012113 A1* | 1/2021 | Petill | G06F 1/1694 |
| 2021/0073945 A1* | 3/2021 | Kim | G06T 3/4053 |
| 2021/0073953 A1 | 3/2021 | Lee | |
| 2022/0188698 A1* | 6/2022 | Halecky | G06Q 30/0613 |

FOREIGN PATENT DOCUMENTS

| | | |
|---|---|---|
| KR | 10-2018-0126220 A | 11/2018 |
| KR | 10-2019-0040797 A | 4/2019 |
| KR | 10-2019-0110965 A | 10/2019 |
| KR | 10-2097905 B1 | 4/2020 |
| KR | 10-2227506 B1 | 3/2021 |
| KR | 10-2021-0057611 A | 5/2021 |
| KR | 10-2260246 B1 | 6/2021 |

OTHER PUBLICATIONS

Laura Lopez-Fuentes et al, Bandwidth Limited Object Recognition in High Resolution Imagery, 2017 IEEE Winter Conference on Applications of Computer Vision (WACV) (2017, pp. 1197-1205) (Year: 2017).*

A Korean Office Action issued on Sep. 30, 2023 in connection with Korean Patent Application No. 10-2022-7027419 which corresponds to the above-referenced U.S. application.

* cited by examiner

Convolution     Pooling    Convolution    Pooling      Fully          Fully         Output
                                                     Connected    Connected    Predictions Feature Map Channels

610

ENSEMBLE MODEL

30

SECOND OBJECT
MODEL
(WEATHER) — 220(b)

FOURTH OBJECT
MODEL (EDGE
ENHANCE) — 220"(d)

ENSEMBLE $\Sigma a_j h_i(x)$
OUTPUT

40

220"'

SECOND MODEL

40

SIXTH OBJECT
MODEL (COLOR
TONE ENHANCE)

NINTH OBJECT
MODEL (SHARPNESS
ENHANCE)

50

220"(f)     45     220"(i)

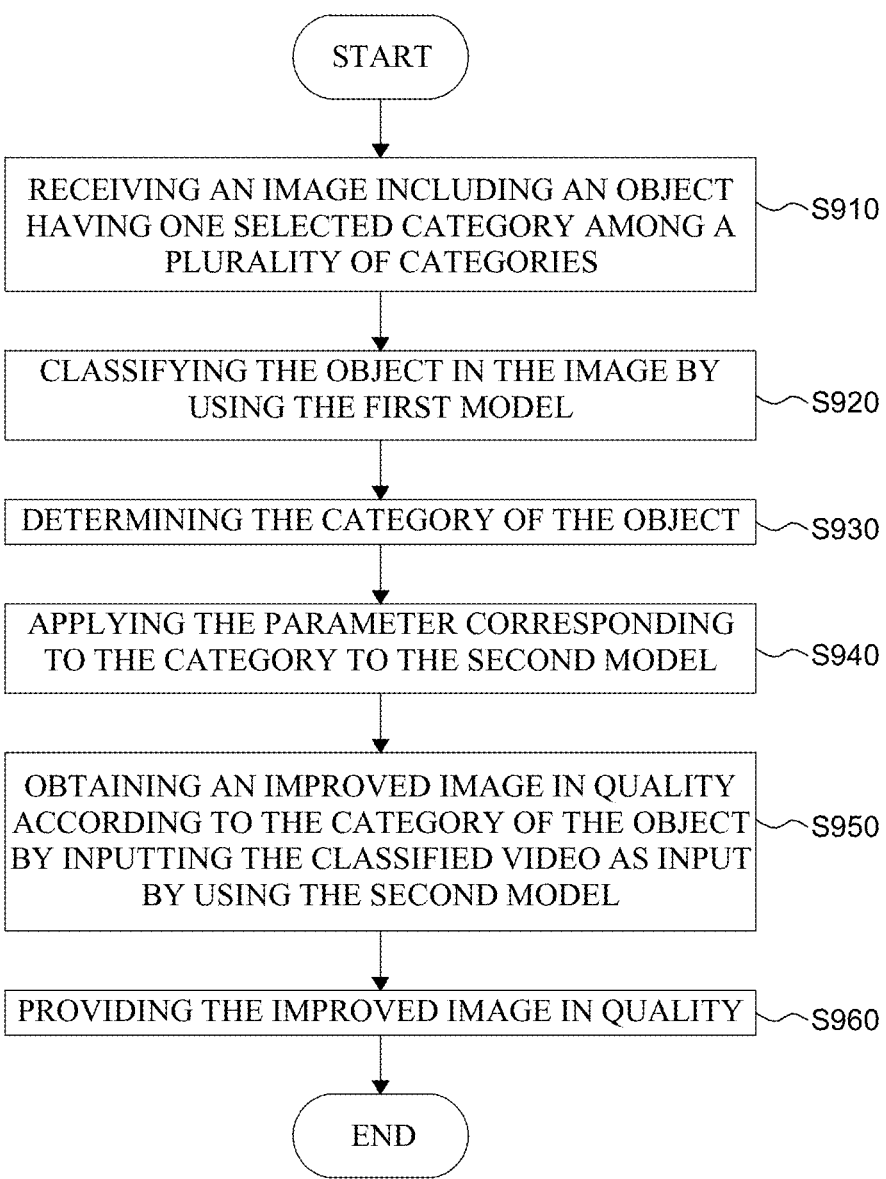

START

RECEIVING AN IMAGE INCLUDING AN OBJECT HAVING ONE SELECTED CATEGORY AMONG A PLURALITY OF CATEGORIES — S910

CLASSIFYING THE OBJECT IN THE IMAGE BY USING THE FIRST MODEL — S920

DETERMINING THE CATEGORY OF THE OBJECT — S930

APPLYING THE PARAMETER CORRESPONDING TO THE CATEGORY TO THE SECOND MODEL — S940

OBTAINING AN IMPROVED IMAGE IN QUALITY ACCORDING TO THE CATEGORY OF THE OBJECT BY INPUTTING THE CLASSIFIED VIDEO AS INPUT BY USING THE SECOND MODEL — S950

PROVIDING THE IMPROVED IMAGE IN QUALITY — S960

END

FIG. 9

IMAGE PROCESSING METHOD USING ARTIFICIAL NEURAL NETWORK, AND NEURAL PROCESSING UNIT

CROSS-REFERENCE TO RELATED APPLICATIONS

This application is a National Stage filing under 35 U.S.C. 371 of International Application No. PCT/KR2022/009556, filed on Jul. 1, 2022, which claims the benefit of earlier filing date and right of priority to Korean Application No. 10-2021-0086357, filed on Jul. 1, 2021, in the Korean Intellectual Property Office, the contents of which are all hereby incorporated by reference herein in their entirety.

BACKGROUND OF THE DISCLOSURE

Technical Field

The present disclosure relates to an image processing method and a neural processing unit using an artificial neural network.

Background Art

Humans are equipped with intelligence that can perform recognition, classification, inference, prediction, and control/decision making. Artificial intelligence (AI) refers to artificially mimicking human intelligence.

The human brain is made up of numerous nerve cells called neurons. Each neuron is connected to hundreds to thousands of other neurons through connections called synapses. In order to imitate human intelligence, the modeling of the operating principle of biological neurons and the connection relationship between neurons is called an artificial neural network (ANN) model. That is, an ANN is a system that connects nodes that mimic neurons in a layer structure.

Meanwhile, the artificial neural network is configured in a form in which convolutional channels and pooling channels are repeated (e.g., FIG. 1). In a convolutional neural network, most of the computation time is occupied by the convolution operation. A convolutional neural network recognizes objects by extracting image features of each channel by a matrix-type kernel, and providing homeostasis such as movement or distortion by pooling. In each channel, a feature map is obtained by convolution of the input data and the kernel. An activation map of the corresponding channel is generated by applying an activation function such as rectified linear unit (ReLU) to the feature map. Pooling may then be applied to the activation map. The neural network that actually classifies the pattern is located at the rear end of the feature extraction neural network, and is called a fully connected layer. In the computational processing of convolutional neural networks, most computations are performed through convolution or matrix multiplication. At this time, the frequency of reading the necessary kernels from memory is high. A significant portion of the operation of the convolutional neural network takes time to read the kernels corresponding to each channel from the memory.

Recently, research is being conducted on detecting or recognizing an object in an image captured from a camera by grafting a technology using such an artificial neural network-based model, or big data, to a device equipped with a camera. For example, an AI-based object recognizer may be applied to devices having a camera, such as an autonomous vehicle, a surveillance camera, or a drone. When such an AI-based object recognition device recognizes an object in an image captured by the camera with a recognition rate higher than a predetermined level, it is possible for devices having such a camera and an object recognition device to provide a service such as autonomous driving based on the recognized object.

The background technology of the present disclosure has been described to make the present disclosure easier to understand. It should not be construed as an admission that the matters described in the background technology of the present disclosure exist as prior art.

SUMMARY OF THE DISCLOSURE

As described above, the object recognition technology using an artificial neural network-based model frequently reads necessary kernels from memory, and thus requires a high amount of power consumption, which may make it difficult to apply a high-performance general-purpose processor.

The inventor of the present disclosure has recognized the following matters.

First, an image with improved quality may be obtained by recognizing an object in an image and performing post processing using an artificial neural network-based model.

More specifically, according to an object, it may be possible to obtain an image with improved quality when providing a model trained to classify the object within the image and using a plurality of independent artificial neural network-based image processing models trained to process the image according to the object classified through the object classification model.

In particular, a plurality of artificial neural network models that correspond to each object (or a category of an object) and to improve image quality according to the characteristics of the object may be selectively applied.

That is, the number of models trained to improve image quality may correspond to the number of classified objects.

Also, a parameter value may be predetermined according to an object or a category of the object. A parameter of a corresponding object or object category is selected according to the classification result, and may be selectively applied to a model for improving image quality.

On the other hand, when processing the inference of an artificial neural network-based model configured to classify objects and improve image quality, the neural processing unit (NPU) may frequently read a node and/or a weight value of each layer of an artificial neural network-based model from a memory, e.g., the main memory.

At this time, as the access to the on-chip memory or the NPU internal memory increases, rather than the access to the main memory, the processing speed of the NPU may be increased and energy consumption may be reduced.

That is, when an artificial neural network-based model is read through an internal memory such as an NPU to perform object recognition or image processing, image processing speed can be improved.

Accordingly, the problem to be solved by the present disclosure is to provide an image processing method and a processing unit that receive an image including an object, classify the object using an artificial neural network-based model, and apply the processing according to the classified object, thereby providing an image with improved image quality.

In order to solve the above problems, an image processing method according to an example of the present disclosure is provided.

The method may include a step of receiving an image including an object, a step of classifying at least one object in the image using a first model on the basis of artificial neural network configured to classify the at least one object by inputting the image, and a step of obtaining an improved image in quality according to the at least one object by inputting the image in which the at least one object is classified by using at least one model among a plurality of second models on the basis of artificial neural network configured to output a specialized processing applied image according to a particular object by inputting the image.

According to the present disclosure, the at least one object may be an object having one category selected from among a plurality of categories, the plurality of second models may be a plurality of models configured to input an image corresponding to each of the plurality of categories and output the applied image of specialized processing according to the plurality of categories. At this point, the method may further include a step of determining a category of the at least one object after classifying the at least one object. Further the step of obtaining the improved image in quality may further include a step of obtaining the improved image in quality by using one of the plurality of second models corresponding to the category of the at least one object.

According to another example of the present disclosure, the first model is configured to output a region of the at least one object by inputting the image, and the method may further include a step of determining the region of the at least one object in the image by using the first model after the receiving step. At this point, the step of classifying the at least one object may include a step of classifying the at least one object based on the region of the at least one object using the first model.

According to the other example of the present disclosure, the step of obtaining the improved image in quality may include a step of obtaining the improved image in quality of the region of the at least one object by using the second models.

According to the other example of the present disclosure, the processing method may further include a step of receiving a gaze data from a head mount display (HMD) device. At this point, the step of determining the region of the at least one object may further include a step of determining the region of the at least one object based on the gaze data.

According to the other example of the present disclosure, the first model may include an input layer and an output layer configured of a plurality of nodes. A number of the second models may correspond to the number of nodes of the output layer of the first model.

According to the other example of the present disclosure, the at least one model may be at least one of a denoising model, a deblurring model, an edge enhancement model, a demosaicing model, a color tone enhancing model, a white balancing model, a super resolution model, a wide dynamic range model, a high dynamic range model, and a decompression model.

According to the other example of the present disclosure, the at least one model may be an ensemble model in which at least two models selected from among the plurality of second models are combined.

In order to solve the above problem, an image processing method according to another example of the present disclosure may be provided.

The method may include steps of receiving an image including an object having one category selected from among a plurality of categories, determining the category of the object in the image by using a first model on the basis of artificial neural network configured to classify the object by inputting the image, and applying a parameter corresponding to the category of the classified object from among a plurality of parameters predetermined for each of the plurality of categories to a second model on the basis of artificial neural network configured to output a specialized processing applied image according to the object by inputting the image, and obtaining an improved image in quality according to the category of the object by inputting the image whose category is determined by using the second model to which the corresponding parameter is applied.

In order to solve the above problem, an image processing unit according to an example of the present disclosure may be provided.

The neural processing unit may include an internal memory configured to store an image comprising an object, a first model and a second model, and a processing element (PE) configured to access the internal memory and configured to process convolution of the first model and the second model, and a controller operatively coupled to the internal memory and the processing element. At this point, the first model may be an artificial neural network-based model configured to classify the object by inputting the image, and the second model may be a plurality of artificial neural network-based models configured to output a specialized processing applied image according to the object by inputting the image. Further, the controller may be configured to induce the PE to classify the object in the image using the first model, and obtain an improved image in quality according to the object based on the image in which the object is classified by using at least one model among the plurality of models of the second model.

According to the present disclosure, the neural processing unit may further include a main memory configured to store the first model and the second model. At this point, the internal memory may be configured to read the first model and the second model in the main memory.

According to another example of the present disclosure, the object may be an object having one category selected from among a plurality of categories, and the second model may be the plurality of models configured to output a processed image of a predetermined process corresponding to each of the plurality of categories by inputting the image corresponding to each of the plurality of categories. At this point, the controller may be configured to induce the PE to determine the category of the object, and obtain the improved image in quality by using one of the plurality of models of the second model corresponding to the category of the object.

According to the other example of the present disclosure, a selection module configured to select at least one model among the plurality of models of the second model may be further included.

According to the other example of the present disclosure, the first model may be further configured to output a region of the object by inputting the image. The controller may be further configured to induce the PE to determine a region of the object in the image using the first model, and classify the object based on the region of the object using the first model.

According to the other example of the present disclosure, the controller may be further configured to induce the PE to obtain the improved image in quality of the region of the object by using the second model.

According to the other example of the present disclosure, the internal memory may further store a gaze data from a head mount display (HMD) device, and the controller may be further configured to induce the PE to determine the region of the object based on the gaze data.

According to the other example of the present disclosure, the first model may include an input layer and an output layer configured of a plurality of nodes, and a number of the second model may corresponds to the number of nodes of the output layer of the first model.

According to the other example of the present disclosure, the at least one model may be at least one of a denoising model, a deblurring model, an edge enhancement model, a demosaicing model, a color tone enhancing model, a white balancing model, a super resolution model, a wide dynamic range model, a high dynamic range model, and a decompression model.

According to the other example of the present disclosure, the at least one model may be an ensemble model in which at least two models selected from among the plurality of second models are combined.

According to the other example of the present disclosure, the neural processing unit may be further configured to combine regions processed by each of the second model to output the improved image in quality.

According to the other example of the present disclosure, each of the first model and the second model may include a parameter. At this point, the internal memory may be configured to read the parameter of the first model or the parameter of the second model tiled to a predetermined size from the main memory, based on a capacity of the internal memory.

According to the other example of the present disclosure, wherein each of the first model and the second model includes a parameter, and the internal memory may be configured to include the parameter of the first model, and optionally read the parameter of the second model from the main memory.

According to the other example of the present disclosure, the second model includes a parameter, the image is a plurality of images, and the internal memory may include the parameter of the second model corresponding to a classification result of the object of a previous image when the classification result of the object for a selected image among the plurality of images by the first model is the same as the classification result of the object for the previous image.

In order to solve the above problem, a processing unit according to the other example of the present disclosure may be provided.

A neural processing unit includes an internal memory configured to store an image including an object having one category selected from among a plurality of categories, a first model and a second model; a processing element (PE) configured to access the internal memory and configured to process convolution of the first model and the second model; and a controller operatively coupled to the internal memory and the processing element. At this point, the first model is an artificial neural network-based model configured to classify the object by inputting the image, and the second model is an artificial neural network-based models configured to output a specialized processing applied image according to the object by inputting the image. Further, the controller may induce the PE to classify the object in the image using the first model. It may be configured to apply a parameter corresponding to the category of the classified object from among a plurality of parameters predetermined for each of the classified objects to the second model, and obtain an improved image in quality according to the category of the object by inputting the image in which the category is classified using the second model to which the corresponding parameter is applied.

According to the present disclosure, a selection module configured to select the plurality of parameters may be further included.

According to the present disclosure, by providing an independent neural network-based model of a model trained to classify an object in an image and a model trained to process an image according to the classified object, it is possible to provide an image with improved quality depending on the object.

Especially, according to the present disclosure, by providing a plurality of independent neural network-based models of a model trained to classify objects within an image and a model trained to process an image according to the classified object, it is possible to obtain an image with improved quality depending on the characteristics of the object.

According to the present disclosure, a neural processing unit (NPU) based processing unit in consideration of an inference operation of an artificial neural network-based model configured to classify objects and improve image quality is provided.

Accordingly, as artificial neural network-based model-based processing is possible through internal memory such as NPU, the processing speed for acquiring an image with improved quality may be improved.

BRIEF DESCRIPTION OF THE DRAWINGS

FIG. 9 is an exemplary flowchart illustrating an image processing method based on a neural processing unit according to another example of the present disclosure.

DETAILED DESCRIPTION OF THE EMBODIMENT

Figure 1:
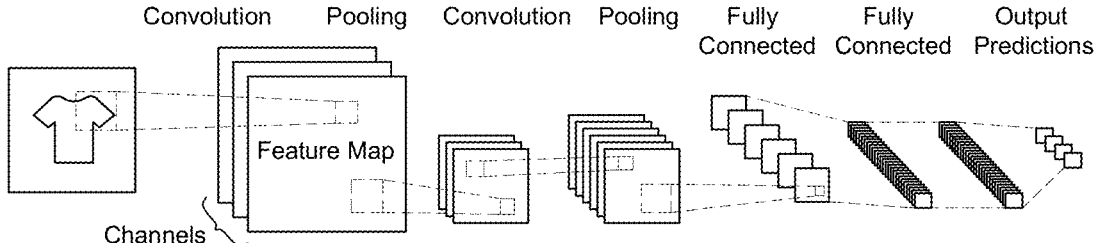
FIG. 1 is a schematic conceptual diagram illustrating an exemplary artificial neural network-based model.

Specific structural or step-by-step descriptions of the embodiments according to the concept of the present disclosure disclosed in this specification or the application are merely illustrative for the purpose of describing the embodiments according to the concept of the present disclosure.

Embodiments according to the concept of the present disclosure may be implemented in various forms. It should not be construed as being limited to the embodiments described in this specification or application.

An embodiment according to the concept of the present disclosure may have various changes and may have various forms. Accordingly, specific embodiments are illustrated in the drawings and will be described in detail in the present specification or application. However, this is not intended to limit the embodiment according to the concept of the present disclosure with respect to the specific disclosure form, and should be understood to include all changes, equivalents, and substitutes included in the spirit and scope of the present disclosure.

Terms such as first and/or second may be used to describe various elements, but the elements should not be limited by the terms.

The above terms are only for the purpose of distinguishing one element from another element, for example, without departing from the scope according to the concept of the present disclosure, and a first element may be termed a second element, and similarly, a second element may also be termed a first element.

When an element is referred to as being "connected to" or "in contact with" another element, it is understood that the other element may be directly connected to or in contact with the other element, but other elements may be disposed therebetween. On the other hand, when it is mentioned that a certain element is "directly connected to" or "directly in contact with" another element, it should be understood that no other element is present therebetween.

Other expressions describing the relationship between elements, such as "between" and "immediately between" or "adjacent to" and "directly adjacent to," etc., should be interpreted similarly.

In this present disclosure, expressions such as "A or B," "at least one of A and/or B," or "one or more of A and/or B" may include all possible combinations thereof. For example, "A or B," "at least one of A and B," or "at least one of A or B" may refer to (1) including at least one A, (2) including at least one B, or (3) including both at least one A and at least one B.

As used herein, expressions such as "first," "second," or "first or second" may modify various elements, regardless of order and/or importance, and it is used only to distinguish one element from other elements, and does not limit the elements. For example, the first user apparatus and the second user apparatus may represent different user apparatus regardless of order or importance. For example, without departing from the scope of rights described in this disclosure, the first element may be named as the second element, and similarly, the second element may also be renamed as the first element.

Terms used in this document are only used to describe specific embodiments, and may not be intended to limit the scope of other examples.

The singular expression may include the plural expression unless the context clearly dictates otherwise. Terms used herein, including technical or scientific terms, may have the same meanings as commonly understood by one of ordinary skill in the art described in this document.

Among terms used in present disclosure, terms defined in a general dictionary may be interpreted as having the same or similar meaning as the meaning in the context of the related art. Also, unless explicitly defined in this document, it should not be construed in an ideal or overly formal sense. In some cases, even terms defined in the present disclosure cannot be construed to exclude embodiments of the present disclosure.

The terms used herein are used only to describe specific embodiments, and are not intended to limit the present disclosure.

It should be understood that as used herein, terms such as "comprise" or "have" are intended to designate that the stated feature, number, step, action, element, part, or combination thereof exists, but it does not preclude the possibility of addition or existence of at least one other features or numbers, steps, operations, elements, parts, or combinations thereof.

Unless defined otherwise, all terms used herein, including technical or scientific terms, have the same meaning as commonly understood by one of ordinary skill in the art to which this disclosure pertains. Terms such as those defined in a commonly used dictionary should be interpreted as having a meaning consistent with the meaning in the context of the related art, and should not be interpreted in an ideal or excessively formal meaning unless explicitly defined in the present specification.

Each of the features of the various examples of the present disclosure may be partially or wholly combined or combined with each other, as those skilled in the art can fully understand, technically various interlocking and driving is possible, and each example may be implemented independently of each other or may be implemented together in a related relationship.

In describing the embodiments, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Definition of Terms

Hereinafter, in order to help understanding of the disclosure presented in the present specification, terms used in the present specification will be briefly summarized.

First model: It may refer to a model trained to classify an object by receiving an image including the object as an input.

The first model may be a model for segmenting a region of an object in an image.

The first model may be an artificial neural network-based classifier capable of classifying an object in an image.

The first model may be an artificial neural network-based object detector capable of detecting an object in an image.

The first model may be an artificial neural network-based model for recognizing and/or sensing an object, but is not limited thereto. For example, the first model may be Segnet, Unet, faster RCNN, FCN trained to segment an object region based on pixel values in an image, Voxnet-based image segmentation model, support vector machine (SVM), decision tree, random forest, adaptive boosting (AdaBoost), or penalized logistic regression (PLR) based classifier.

Second model: It may refer to a model trained to output an image to which a predetermined process is applied according to a classified object by inputting an image. That is, the second model may be a plurality of models trained to improve image quality for each object classified by the first model. In other words, the number of second models may correspond to the number of output nodes of the first model. On the other hand, the second model may be at least one of a denoising model, a deblurring model, an edge enhancement model, a demosaicing model, a color tone enhancing model, a white balancing model, a super resolution model, a wide dynamic range model, a high dynamic range model, and a decompression model.

For example, the second model may be at least one image processing model among a first object model that provides super-resolution (S/R) processing for the input image, a second object model trained to provide denoising, that is, denoising processing, for the input image, a third object model trained to provide a deblurring process that removes the blurring phenomenon on the input image, a fourth object model trained to provide edge enhancement processing for the input image, a fifth object model trained to provide a demosaicing process for reconstructing a full color image with respect to the input image, a sixth object model trained to provide color tone enhancement processing for the input image, a seventh object model trained to provide white balancing processing for the input image, and an eighth object model trained to provide decompression processing for removing compression on the input image. Each object model may be a deep-learning trained model that is trained with a respective training dataset prepared according to a specific processing function.

Furthermore, the second model is a model that provides quality improvement for each category of images, and may be a plurality of models trained to output images of improved quality and specialized according to a category of an image such as a food image model trained to provide images of improved quality for food images, a weather image model trained to provide images of improved quality for weather images, an animal and insect image model trained to provide improved quality images for animal and insect images, a landscape image model trained to provide improved quality images for landscape images, a sports image model trained to provide improved quality images for sports images, a clothes image model trained to provide improved quality images for clothes images, a human and emotional image model trained to provide improved quality images for human and emotional images, and a traffic image model trained to provide improved quality images for traffic images. Each object model may be a deep learning trained model that is trained with a respective training dataset prepared according to a specific image quality improvement.

However, it is not limited thereto, and the second model may be a model for improving image quality in which a combination of various object models is ensembled. Furthermore, the second model may be a model in which a plurality of object models is connected in parallel or in series.

Furthermore, the second model may exist as a single model. For example, preset parameters for a plurality of objects may be applied to a single second model, and an optimal image with improved quality may be provided according to the classified objects. Here, the image quality improvement may be an improvement in quality that is visually perceived by humans, but is not limited thereto. Here, the parameter may be a weight applied to each layer of each model and a value of a kernel. Each parameter may be trained according to each object model. In particular, in the present specification, image quality improvement may refer to an improvement in the object recognition rate of a machine-learning model. An improvement in quality that is visible to humans does not always lead to an improvement in the object recognition rate in a machine-learning model. For example, image quality improvement in a road image may be a human-based esthetic improvement or a quality improvement capable of increasing a recognition rate in a machine-learning model.

NPU: An abbreviation of neural processing unit (NPU), which may refer to a processor specialized for computation of an artificial neural network-based model separately from a central processing unit (CPU). It is also possible to be referred to as an artificial neural network accelerator.

Controller: A controller, particularly an NPU controller, may refer to a module that controls an overall task of the NPU. For the controller to run in the NPU, the compiler analyzes the data locality of the ANN model and receives the operation sequence information of the compiled ANN model to determine the task processing sequence of the NPU. The controller may store tiling information for each layer of the ANN model based on the internal memory, that is, the memory size of the NPU and the performance of the processing element array. Furthermore, the controller may control the NPU to read the first model and/or the second model from the external main memory to the internal memory according to the NPU memory capacity. Furthermore, the controller can control the overall tasks of the NPU by using the register map. The controller may be included in the NPU or may be located outside the NPU.

ANN: An abbreviation of artificial neural network. It may refer to a network in which nodes are connected in a layer structure to imitate human intelligence by mimicking those neurons in the human brain that are connected through synapse.

DNN: An abbreviation of deep neural network, which may mean that the number of hidden layers of the artificial neural network is increased in order to implement higher artificial intelligence.

CNN: An abbreviation for convolutional neural network, a neural network that functions similarly to image processing in the visual cortex of the human brain. Convolutional neural networks are known to be suitable for image processing, and are known to be easy to extract features of input data and to identify patterns of features. A weight in CNN may refer to a kernel of size N×M.

Hereinafter, the present disclosure will be described in detail by describing embodiments of the present disclosure with reference to the accompanying drawings.

First, a convolutional neural network (CNN), which is a type of a deep neural network (DNN) among artificial neural networks, will be described with reference to FIG. 1.

FIG. 1 illustrates a convolutional neural network according to the present disclosure.

Referring to FIG. 1, a convolutional neural network includes at least one convolutional layer, at least one pooling layer, and at least one fully connected layer.

For example, a convolution may be defined by two main parameters, the size of the input data (typically a 1×1, 3×3, or 5×5 matrix) and the depth of the output feature map (the number of kernels). These key parameters can be computed by convolution. These convolutions may start at depth 32, continue to depth 64, and end at depth 128 or 256. The convolution operation may refer to an operation of sliding a kernel of size 3×3 or 5×5 over the input image matrix, which is the input data, multiplying each element of the kernel and each element of the input image matrix overlapping each other, and then adding them all together. Here, the input image matrix is a 3D patch, and the kernel means the trained weight matrix called weight which are the same. That is, the weight of the artificial neural network may be a parameter capable of performing a specific function of a specific artificial neural network.

In other words, convolution refers to an operation in which a 3D patch is converted into a 1D vector by a tensor product with a learning weight matrix, and the vector is spatially reassembled into a 3D output feature map. All spatial locations of the output feature map may correspond to the same location of the input feature map.

The convolution layer can perform convolution between the input data and the kernel (i.e., the weight matrix) that is trained over many iterations of the gradient update during the learning process. If (m, n) is the kernel size and W is set as the weight value, the convolution layer can perform convolution of the input data and the weight matrix by calculating the dot product.

The step size that the kernel slides across the input data is called the stride, and the kernel region (m×n) can be called the receptive field. The same convolutional kernel is applied across different locations of the input, which reduces the number of kernels trained. This also enables position invariant learning, where if a significant pattern is present in the input, the convolution filter (i.e., the kernel) can learn that pattern regardless of the position of the sequence.

An activation function may be applied to the output feature map generated as described above to finally output the activation map. Also, the weight used in the current layer may be transmitted to the next layer through convolution. The pooling layer may perform a pooling operation to reduce the size of the feature map by down-sampling the output data (i.e., the activation map). For example, the pooling operation may include, but is not limited to, max pooling and/or average pooling. The maximum pooling operation uses the kernel, and outputs the maximum value in the region of the feature map overlapping the kernel by sliding the feature map and the kernel. The average pooling operation outputs the average value within the region of the feature map overlapping the kernel by sliding the feature map and the kernel. As such, since the size of the feature map is reduced by the pooling operation, the number of weights of the feature map is also reduced.

The fully connected layer may classify data output through the pooling layer into a plurality of classes (i.e., estimated values), and may output the classified class and a score thereof. Data output through the pooling layer forms a three-dimensional feature map, and this three-dimensional feature map can be converted into a one-dimensional vector and input as a fully connected layer.

A convolutional neural network can be adjusted or trained so that input data leads to specific inference output value. In other words, a convolutional neural network can be tuned using back propagation based on comparisons between the output inference value and ground truth until the output inference value progressively matches or approximates the ground truth.

A convolutional neural network can be trained by adjusting the weights between neurons based on the difference between the ground truth data and the actual output. The trained weight can be used as a parameter of a specific artificial neural network.

Figure 2:
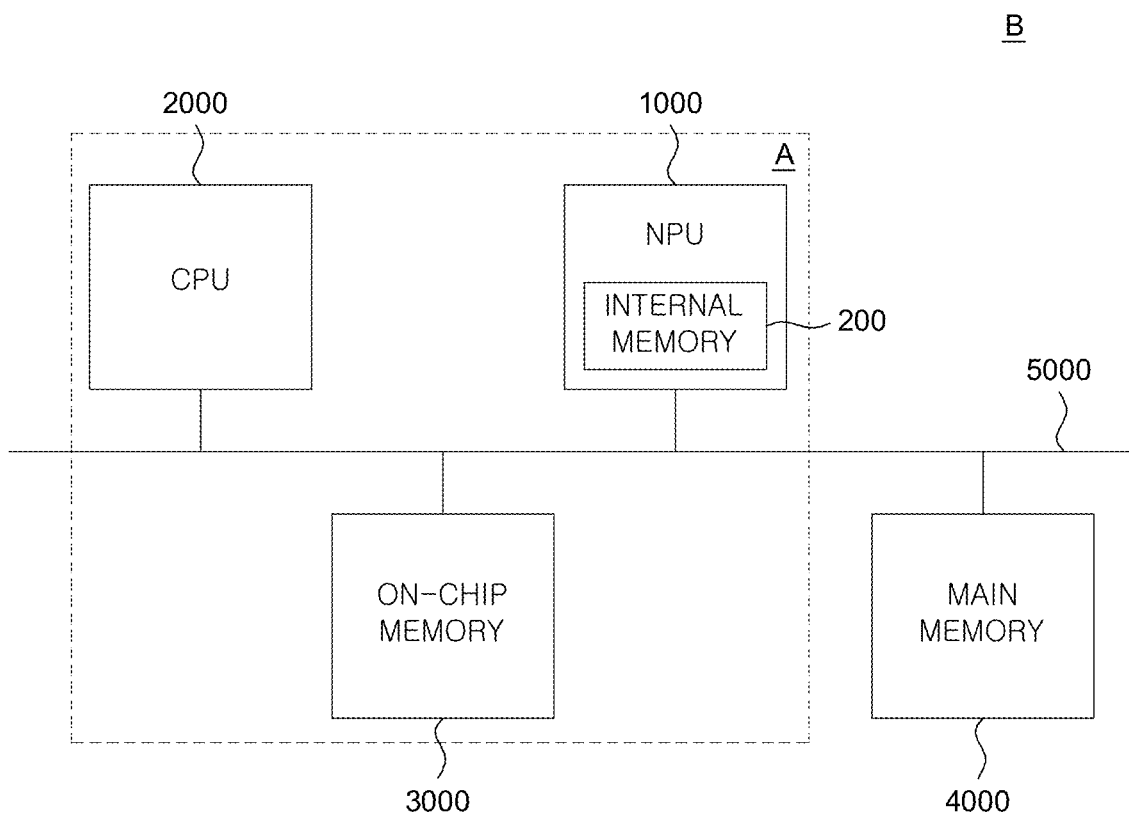
FIG. 2 is a schematic conceptual diagram illustrating an apparatus including a neural processing unit according to an example of the present disclosure.

FIG. 2 illustrates an apparatus including a neural processing unit according to an example of the present disclosure.

Referring to FIG. 2, the apparatus B including the NPU 1000 includes an on-chip region A. The main memory 4000 may be included outside the on-chip region. The main memory 4000 may be, for example, a system memory such as DRAM. Although not shown, a storage unit including a ROM may be included outside the on-chip region A.

In the on-chip region A, a general-purpose processing unit such as a central processing unit (CPU) 2000, an on-chip memory 3000, and an NPU 1000 are disposed. The CPU 2000 is operatively connected to the NPU 1000, the on-chip memory 3000, and the main memory 4000.

However, the present disclosure is not limited thereto, and it is also possible to configure the NPU 1000 to be included in the CPU 2000.

The on-chip memory 3000 is a memory mounted on a semiconductor die and may be a memory for separate caching from the main memory 4000 access.

For example, the on-chip memory 3000 may be a memory configured to be accessed by other on-chip semiconductors. For example, the on-chip memory 3000 may be a cache memory or a buffer memory.

The NPU 1000 includes an internal memory 200, and the internal memory 200 may include, for example, SRAM. The internal memory 200 may be a memory used only for operations in the NPU 1000. Internal memory 200 may be referred to as NPU internal memory. Here, the term may substantially mean data, for example, the data configured to store parameters of a first model for recognizing and classifying objects in an image and parameters of a second model providing specialized image processing according to objects, related to the artificial neural network processed by the NPU 1000 in the internal memory 200. Here, the parameter may include a register map, a weight, a kernel, an input feature map, an output feature map, and the like.

For example, the internal memory 200 may be a buffer memory and/or cache memory configured to store a weight, a kernel, and/or a feature map required for the NPU 1000 operation. However, it is not limited thereto.

For example, the internal memory 200 may be configured as a memory device that reads and writes SRAM, MRAM, register file, and the like faster than the main memory 4000. However, the it is not limited thereto.

The apparatus B including the NPU 1000 includes at least one of an internal memory 200, an on-chip memory 3000, and a main memory 4000.

The term "at least one memory" described below is intended to include at least one of the internal memory 200 and the on-chip memory 3000.

Further, the description of the on-chip memory 3000 is intended to include the internal memory 200 of the NPU 2000 or a memory external to the NPU 2000 but in the on-chip region A.

However, it is also possible to distinguish the internal memory 200 and/or the on-chip memory 3000, which refer to at least one memory, from the main memory 4000 based on the bandwidth of the memory rather than the locational characteristic.

In general, the main memory 4000 refers to a memory that is easy to store a large amount of data, has a relatively low memory bandwidth, and consumes a relatively large amount of power.

In general, the internal memory 200 and the on-chip memory 3000 refer to memories having a relatively high memory bandwidth and relatively low power consumption, but are inefficient for storing large amounts of data. In the present disclosure, "internal memory 200" may be used interchangeably with "NPU memory."

Each element of the apparatus B including the NPU 1000 may communicate via the bus 5000. There may be at least one bus 5000 of apparatus B. The bus 5000 may be referred to as a communication bus, a system bus, or the like.

The internal memory 200 and the on-chip memory 3000 of the NPU 1000 may further include a separate dedicated bus in order to guarantee more than a specific bandwidth for processing the weights and feature maps of the first and second models based on the artificial neural network.

It is also possible to further include a separate dedicated bus between the on-chip memory 3000 and the main memory 4000 in order to guarantee more than a specific bandwidth. The specific bandwidth may be determined based on the processing performance of the processing element array of the NPU 1000.

Between the internal memory 200 and the main memory 4000 of the NPU 1000, it is also possible to further include a separate dedicated bus to ensure more than a specific bandwidth. The specific bandwidth may be determined based on the processing performance of the processing element array of the NPU 1000.

The apparatus B with the NPU 1000 may be configured to further include a direct memory access (DMA) module so as to directly control the internal memory 200, the on-chip memory 3000, and/or the main memory 4000.

For example, the DMA module may be configured to directly control the data transfer of the NPU 2000 and the on-chip memory 3000 by directly controlling the bus 5000.

For example, the DMA module may be configured to directly control data transfer between the on-chip memory 3000 and the main memory 4000 by directly controlling the bus 5000.

For example, the DMA module may be configured to directly control data transfer between the internal memory 200 and the main memory 4000 by directly controlling the bus 5000.

The neural processing unit (NPU) 1000 is a processor specialized to perform an operation for an artificial neural network. The NPU 1000 may be referred to as an AI accelerator.

An artificial neural network refers to a network of artificial neurons that multiplies and adds weights when multiple inputs or stimuli are received, and transforms and transmits the value obtained by adding an additional deviation through an activation function. The artificial neural network trained in this way can be used to output inference results from input data.

The NPU 1000 may be a semiconductor implemented as an electric/electronic circuit. The electric/electronic circuit may include a number of electronic components (e.g., a transistor, a capacitor). The NPU 1000 may include a processing element (PE) array, an NPU internal memory 200, an NPU scheduler, and an NPU interface. Each of the processing element array, the NPU internal memory 200, the NPU scheduler, and the NPU interface may be a semiconductor circuit to which numerous transistors are connected.

Therefore, some of them may be difficult to identify and distinguish with the naked eye, and may be identified only by an operation. For example, an arbitrary circuit may operate as an array of processing elements, or may operate as an NPU scheduler.

The NPU 1000 may include a processing element array, an NPU internal memory 200 configured to store at least a portion of the neural network-based first model and the second model that can be inferred in the processing element array, and an NPU controller (or scheduler) configured to control the processing element array and the NPU internal memory 200 based on data locality information of the artificial neural network-based first model and second model or based on the information on the structure of the artificial neural network-based first model and second model.

The artificial neural network-based first model and second model may include information on data locality or structure of the artificial neural network-based model.

The processing element array may perform operations for the artificial neural network. For example, when input data of an image including an object is input, the processing element array may classify the object with respect to the first model and may perform training to process the image with respect to the object classified with the second model. After learning is completed, when input data is input, the processing element array may perform an operation of generating and deriving an image with improved quality for each type of object through the trained artificial neural network-based first model and second model. It is also possible for the array of processing elements to be embodied in a variant of at least one processing element.

In this case, the NPU 1000 may load the data of the artificial neural network-based first model and second model stored in the main memory 4000 through the NPU interface, that is, the parameters, to the NPU internal memory 200. The NPU interface may communicate with the main memory 4000 through the bus 5000.

The NPU controller is configured to control the operation of the processing element array for the inference operation of the NPU 1000 and the read and write sequence of the NPU internal memory 200. The NPU controller is also configured to resize at least a portion of the channel.

The NPU controller may analyze the structures of the first model and the second model based on the artificial neural network or may be provided with the structures of the first model and the second model based on the artificial neural network. Next, the NPU controller may sequentially determine the operation sequence for each layer. That is, when the structures of the first model and the second model based on the artificial neural network are determined, the operation sequence for each layer may be determined. The sequence of operations or data flow according to the structures of the artificial neural network-based first model and the second model may be defined as data locality of the artificial neural network-based first model and the second model at the algorithm level.

The NPU controller sequentially determines the operation sequence for each layer by reflecting the structures of the first and second models based on the artificial neural network. That is, when the structures of the first model and the second model based on the artificial neural network are determined, the operation sequence for each layer may be determined. Such a sequence can be defined as the order of operations according to the structure of the first model and the second model based on the artificial neural network, or the data locality of the first model and the second model based on the artificial neural network at the algorithm level in the order of the data flow.

The data locality of the first model and the second model based on the artificial neural network may be determined in consideration of the structure of each model, the number of layers, the number of channels, and the NPU structure.

When the compiler compiles the first model and the second model based on the artificial neural network so that the first model and the second model based on the artificial neural network are executed in the NPU 1000, the artificial neural network data locality of the first model and the second model based on the artificial neural network may be reconstructed at the neural processing unit-memory level. For example, the compiler may be executed by the CPU 2000.

That is, according to the compiler, the algorithms applied to the first and second models based on the artificial neural network, and the operating characteristics of the NPU 1000, the size of the weight, and the size of the feature map, the weight values loaded into the internal memory and the size of the channel may be determined.

For example, even in the case of the same first model and the second model, the data locality of the first model and the second model to be processed may be configured according to the method in which the NPU 1000 calculates the corresponding first model and the second model, for example, weight tiling, feature map tiling, stationary techniques of the processing elements, the number of processing elements of the NPU 1000, the internal memory capacity of the NPU 1000, the memory hierarchy within the NPU 1000, algorithm characteristics of the compiler for scheduling the operation order of the NPU 1000 for processing the first model and the second model, and the like. When an operation sequence of the NPU 1000 for processing the first model and the second model is scheduled by the compiler, the controller may control each element of the NPU 1000 by the determined scheduling.

Hereinafter, a neural processing unit used in various embodiments of the present disclosure will be described in detail with reference to FIG. 3.

Figure 3:
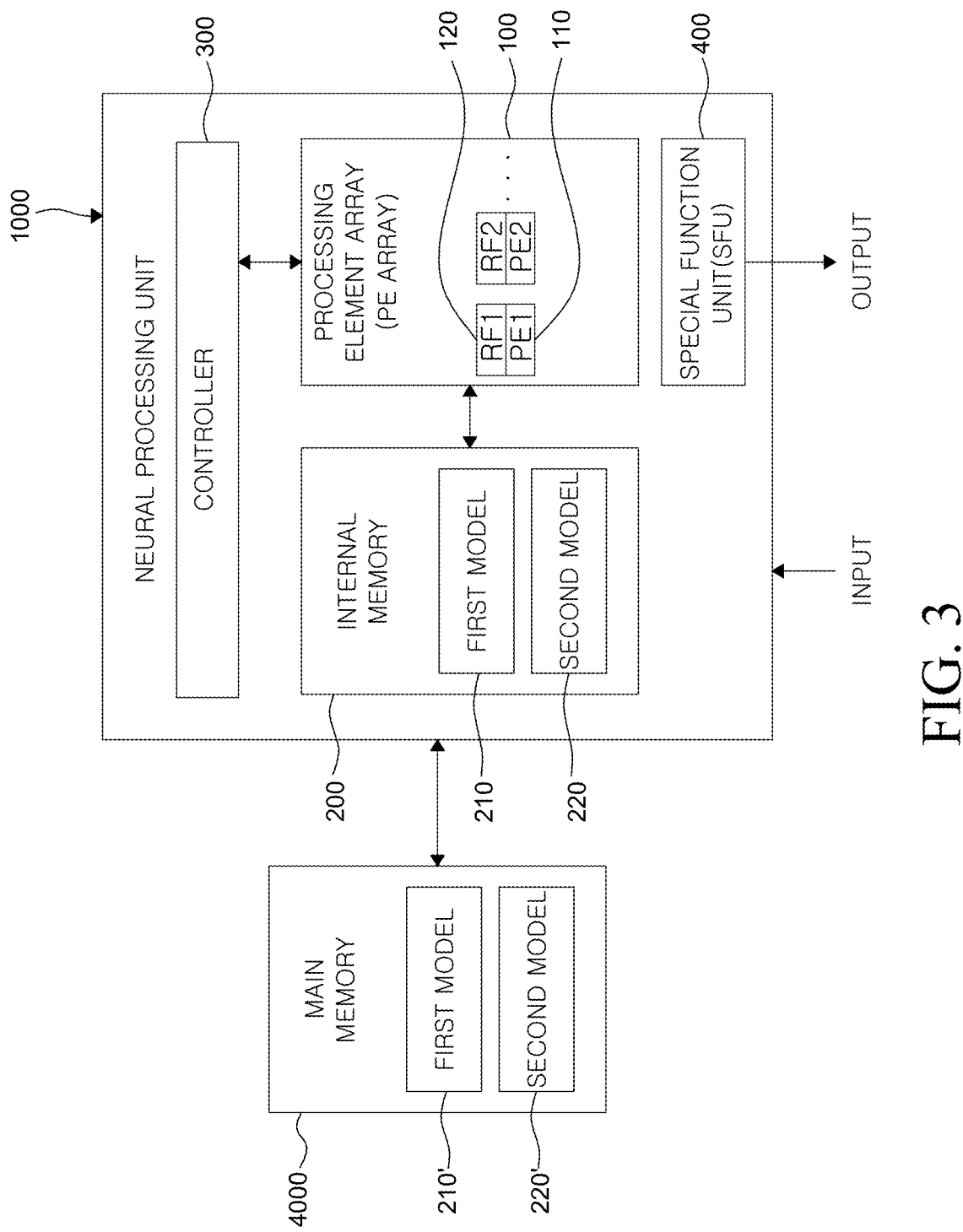
FIG. 3 is a schematic conceptual diagram illustrating a neural processing unit according to an example of the present disclosure.

FIG. 3 illustrates a neural processing unit according to an example of the present disclosure.

The neural processing unit (NPU) 1000 may include a processing element array 100, an internal memory 200, a controller 300, and a special function unit (SFU).

More specifically, the processing element array 100 is configured to include a plurality of processing elements (PE1 . . . ) 110 configured to calculate node data of an artificial neural network and weight data of a connection network. Each processing element may include a multiply and accumulate (MAC) operator and/or an arithmetic logic unit (ALU) operator. However, examples according to the present disclosure are not limited thereto.

Although in the presented embodiment a plurality of processing elements (PE1 . . . ) 110 is shown, by replacing the MAC in one processing element, it is also possible to configure operators implemented as a plurality of multipliers and adder trees to be arranged in parallel. In this case, the processing element array 100 may also be referred to as at least one processing element including a plurality of operators.

The plurality of processing elements (PE1 . . . ) 110 in the presented embodiment is merely an example for convenience of description, and the number of the plurality of processing elements (PE1 . . . ) 110 is not limited. The size or number of the processing element array may be determined by the number of the plurality of processing elements (PE1 . . . ) 110. The size of the processing element array may be implemented in the form of an N×M matrix. Where N and M are integers greater than zero. Accordingly, the processing element array 100 may include N×M processing elements. That is, there may be more than one processing element.

In addition, the processing element array 100 may be configured of a plurality of sub-modules. Accordingly, the processing element array 100 may include processing elements configured of N×M×L sub-modules. In more detail, L is the number of sub-modules of the processing element array, and may be referred to as a core, an engine, or a thread.

The size of the processing element array 100 may be designed in consideration of characteristics of the first model and the second model in which the NPU 1000 operates. In more detail, the number of processing elements may be determined in consideration of the size of parameters of the first model and the second model to be operated, a required operating speed, a required power consumption, and the like. The size of the parameters of the first model and the second model may be determined in correspondence with the number of layers of the first model and the second model and the size of the weight of each layer.

Accordingly, the size of the processing element array 100 according to an example of the present disclosure is not limited. As the number of processing elements (PE1 . . . ) 110 of the processing element array 100 increases, although the parallel computing power of the operating first model and the second model is increased, the manufacturing cost and physical size of the NPU 1000 may be increased.

The processing element array 100 is configured to perform functions such as addition, multiplication, and accumulation required for artificial neural network operation. In other words, the processing element array 100 may be configured to perform a multiplication and accumulation (MAC) operation. That is, the processing element array 100 may be referred to as a plurality of MAC operators.

In the presented embodiment, the processing element array 100 may further include, in addition to the plurality of processing elements (PE1 . . . ), respective register files (RF1 . . . ) 120 corresponding to each of the processing elements (PE1 . . . ). At this time, the plurality of processing elements (PE1 . . . ) and the plurality of register files (RF1 . . . ) shown in FIG. 3 are merely examples for convenience of description, and the number of the plurality of processing elements (PE1 . . . ) and the plurality of register files (RF1 . . . ) is not limited.

That is, the processing element array 100 may perform an operation for an artificial neural network. For example, when input data of an image including an object is input, the processing element array 100 may classify the object with respect to the first model and process the image with respect to the object classified with the second model.

The processing element array may perform an operation of generating and deriving an image with improved quality for each type of object through the trained artificial neural network-based first model and second model.

On the other hand, it is not limited thereto, and the processing element array 100 may classify the object in the input image and perform a specialized processing according to the object by using the first model 210 and the second model 220 in the NPU internal memory 200.

Selectively, the NPU 1000 may load the data of the first model 210' and the second model 220 stored in the main memory 4000 through the NPU interface to the NPU internal memory 200, and the processing element array 100 may classify an object in an input image using data of the first model 210' and the second model 220 load into the internal memory 200, and may perform specialized processing according to the object.

According to an example of the present disclosure, the NPU 1000 may perform a process of reading the parameter of the first model or the parameter of the second model tiled to a predetermined size from the main memory 4000 according to the capacity of the NPU internal memory 200.

For example, the NPU 1000 may be alternatively read the first model and the second model in the main memory 4000 to the NPU internal memory 200 when the capacity of the NPU internal memory 200 is small.

According to another example of the present disclosure, the parameters of the first model are stored in the NPU internal memory 200, and the process of reading the parameters of the second model from the main memory 4000 can be selectively performed according to the available capacity.

According to another example of the present disclosure, when the object classification result of the image by the first model is the same as the object classification result of the previous image, the NPU 1000 may maintain the parameter of the second model corresponding to the object classification result for the previous image in the NPU internal memory 200.

That is, if the object recognition result is the same as the previous image result, the NPU 1000 may be configured to reuse the parameters of the first model stored in the NPU internal memory 200. That is, according to the capacity of the memory of the NPU 1000, the first model 210, 210' and the second model 220, 220' may be present in the NPU 1000 or outside (e.g., the main memory).

Meanwhile, the internal memory 200 may be a volatile memory. The volatile memory may be a memory in which data is stored only when power is supplied, and stored data is lost when power supply is cut off. The volatile memory may include a static random access memory (SRAM), a dynamic random access memory (DRAM), and the like. The internal memory 200 may preferably be an SRAM, but is not limited thereto.

According to the other example of the present disclosure, the NPU 1000 may be configured to output an image of improved quality by combining regions processed by each of the plurality of second models. That is, one output image may be generated by combining pixels of an image-processed object by a plurality of second models.

Next, the NPU controller 300 may be configured to control the processing element array 100 and the NPU internal memory 200 in consideration of the parameters of the first model and the second model, for example, the size of weight values, the size of the feature map, and the calculation sequence of the weight values and the feature map, and the like.

The NPU controller 300 may control to induce at least one processing element to classify the object in the image using the first model, and generate an image that is improved in quality according to the object based on the image in which the object is classified using at least one model among a plurality of second models.

The NPU controller 300 may control to induce at least one processing element to classify the object and determine the category of the object in the image using the first model, apply a parameter corresponding to the category of the classified object among a plurality of predetermined parameters for each of the plurality of categories using the second model, and generate an image improved in quality according to the category of the object by inputting the classified image.

On the other hand, the NPU controller 300 may receive the size of the weight values and the size of the feature map to be calculated in the processing element array 100, the calculation sequence of the weight values and the feature map, and the like. In this case, the data of the artificial neural network may include node data or feature map of each layer, and weight data of each connection network connecting nodes of each layer. At least some of the data or parameters of the artificial neural network may be stored in a memory provided inside the NPU controller 300 or the NPU internal memory 200.

Among the parameters of the artificial neural network, the feature map may be configured as a batch-channel. Here, the plurality of batch-channels may be, for example, object images captured by a plurality of image sensors during substantially the same period (e.g., within 10 or 100 ms).

Not limited to the above description, the NPU controller 300 may control the processing element array 100 and the internal memory 200 for various convolution operations for object classification and image processing in the image.

Meanwhile, the special function unit (SFU) may include, for example, an operation unit for pooling or applying an activation function such as ReLU, and is not limited thereto, and may include a unit for various operations except for convolution operation.

According to the present disclosure, the NPU 1000 may further include a selection module (not shown) configured to select a model corresponding to an object (or a category thereof) from among the plurality of second models 220 and 220' or select a plurality of parameters applicable to the single second model 220 and 220 according to the object classification result of the first model 210 and 210'.

In this case, the selection module may be included in the controller 300 or the special function unit 400.

Furthermore, the controller 300 may be further configured to control the selection module.

Hereinafter, one processing element of the processing element array 100 will be described in detail with reference to FIG. 4.

Figure 4:
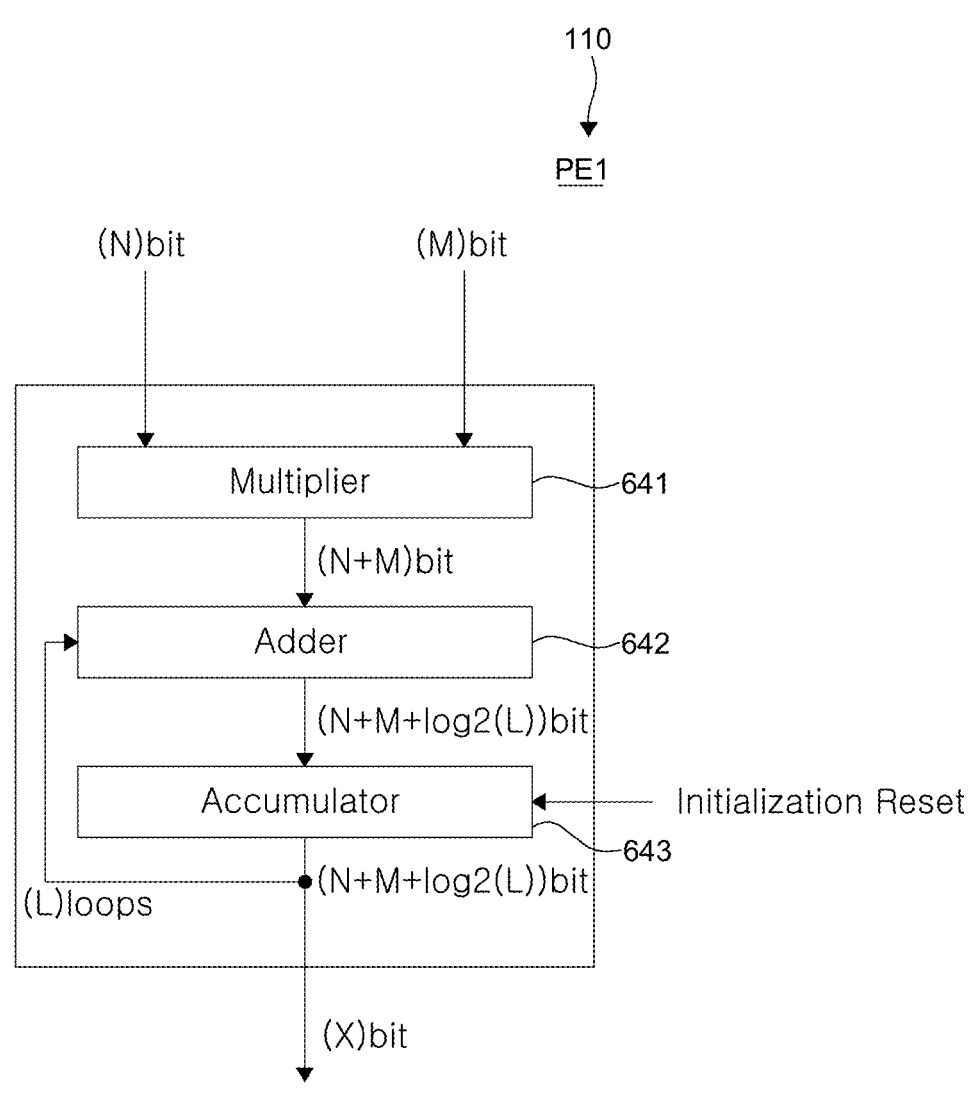
FIG. 4 is a schematic conceptual diagram illustrating one processing element of an array of processing elements that may be applied to the present disclosure.

FIG. 4 illustrates one processing element of an array of processing elements that may be applied to the present disclosure.

Referring to FIG. 4, the first processing element PE1 110 may include a multiplier 111, an adder 112, and an accumulator 113. However, examples according to the present disclosure are not limited thereto, and the processing element array 100 may be modified in consideration of the computational characteristics of the artificial neural network.

The multiplier 111 multiplies the received N-bit data and M-bit data. The operation value of the multiplier 111 is output as (N+M) bit data. Where N and M are integers greater than zero. The first input unit receiving N-bit data may be configured to receive a feature map, and the second input unit receiving M-bit data may be configured to receive a weight.

Since the value of the feature map changes for each frame, it can be set as a variable value. The weight for which training is completed may be set to a constant value because the value does not change unless additional learning is performed.

That is, the multiplier 111 may be configured to receive one variable and one constant. In more detail, the variable value input to the first input unit may be an input feature map of the artificial neural network. The constant value input to the second input unit may be a weight of the artificial neural network.

Meanwhile, when zero value is inputted to one of the first input unit and the second input unit of the multiplier 111, since the first processing element PE1 110 recognizes that the operation result is zero even if no operation is performed, the operation of the multiplier 111 may be limited so that the operation is not performed.

For example, when zero is inputted to one of the first input unit and the second input unit of the multiplier 111, the multiplier 111 may be configured to operate in a zero-skipping manner.

The bit width of data input to the first input unit and the second input unit of the multiplier 111 may be determined according to quantization of each feature map and weight of the artificial neural network model. For example, when the feature map of the first layer is quantized to five bits and the weight of the first layer is quantized to seven bits, the first input unit may be configured to receive 5-bit width data, and the second input unit may be configured to receive 7-bit width data.

The adder 112 adds the calculated value of the multiplier 111 and the calculated value of the accumulator 113. When (L) loops is zero, since there is no accumulated data, the operation value of the adder 112 may be the same as the operation value of the multiplier 111. When (L) loops is one, a value obtained by adding an operation value of the multiplier 111 and an operation value of the accumulator 113 may be an operation value of the adder.

The accumulator 113 temporarily stores the data output from the output unit of the adder 112 so that the operation value of the adder 112 and the operation value of the multiplier 111 are accumulated by the number of L loops. Specifically, the calculated value of the adder 112 output from the output unit of the adder 112 is input to the input unit of the accumulator 113, the operation value input to the accumulator 113 is temporarily stored in the accumulator 113 and is output from the output unit of the accumulator 113. The output operation value is input to the input unit of the adder 112 by a loop. At this time, the operation value newly output from the output unit of the multiplier 111 is inputted to the input unit of the adder 112. That is, the operation value of the accumulator 113 and the new operation value of the multiplier 111 are input to the input unit of the adder 112, and these values are added by the adder 112 and outputted through the output unit of the adder 112. The data output from the output unit of the adder 112, that is, a new operation value of the adder 112, is input to the input unit of the accumulator 113, and subsequent operations are performed substantially the same as the above-described operations as many times as the number of loops.

As such, since the accumulator 113 temporarily stores the data output from the output unit of the adder 112 in order to accumulate the operation value of the multiplier 111 and the operation value of the adder 112 by the number of loops, the data input to the input unit of the accumulator 113 and data output from the output unit may have the same bit width as data output from the output unit of the adder 112 (N+M+log 2(L)) bits. Where L is an integer greater than zero.

When the accumulation is finished, the accumulator 113 may receive an initialization reset to initialize the data stored in the accumulator 113 to zero. However, examples according to the present disclosure are not limited thereto.

The output data (N+M+log 2(L)) bits of the accumulator 113 may be an output feature map.

Hereinafter, an image processing method according to various embodiments of the present disclosure will be described with reference to FIGS. 5, 6, 7, and 8A-8D.

Figure 5:
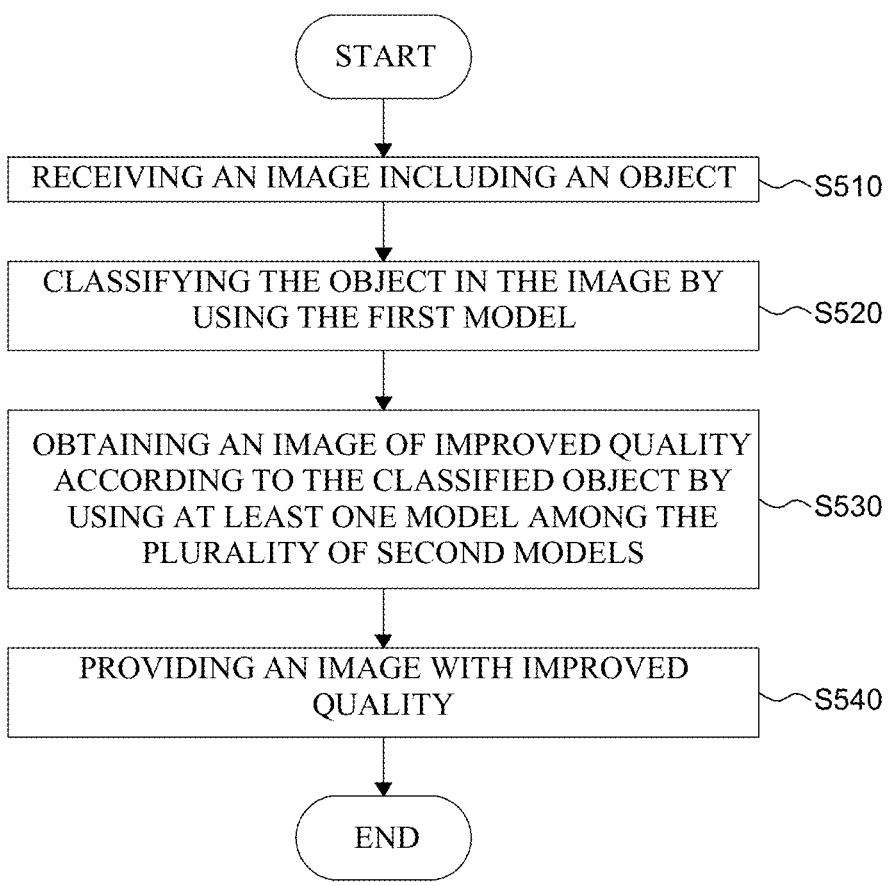
FIG. 5 is a flowchart illustrating an image processing method based on a neural processing unit according to an example of the present disclosure.
Figure 6:
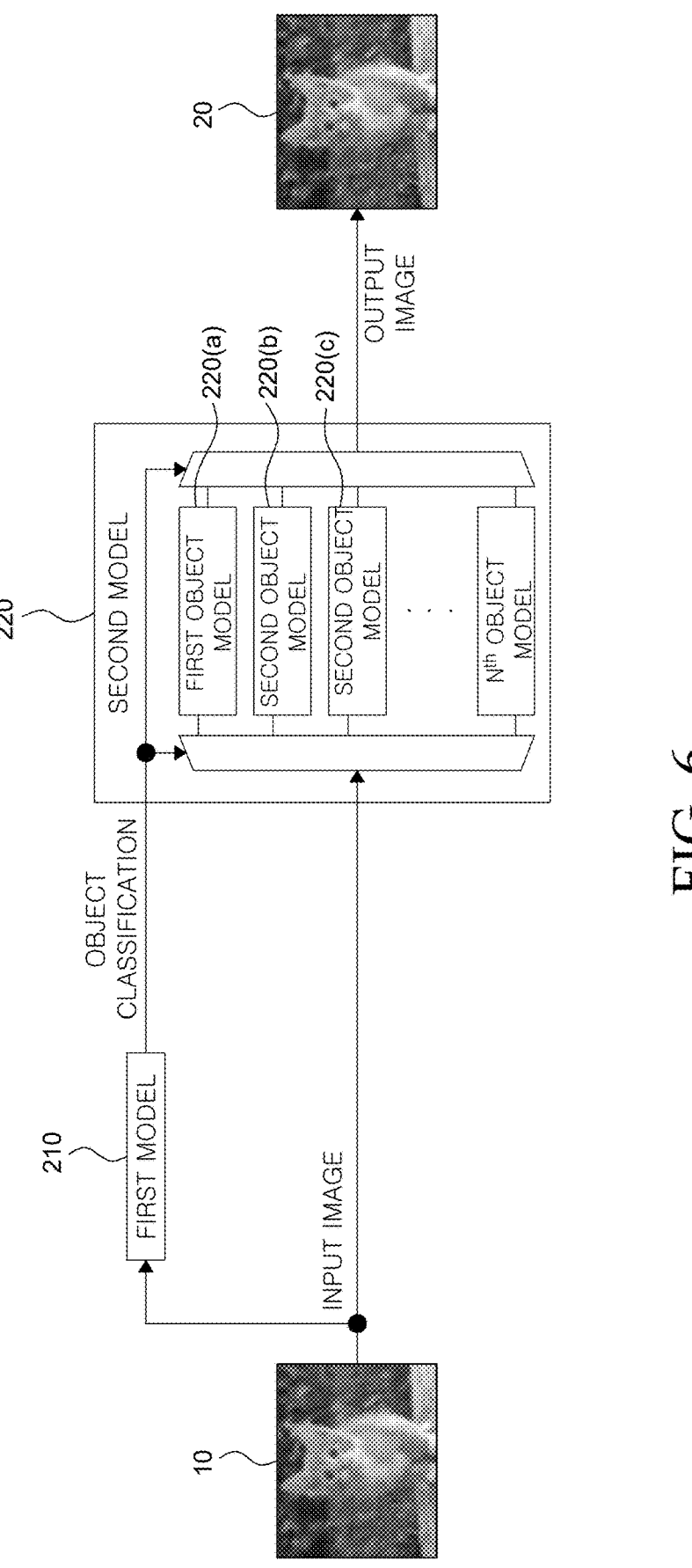
FIGS. 6 and 7 are exemplary schematic diagrams respectively illustrating procedures to output an image with improved quality using a first model and a second model in a neural processing unit according to an example of the present disclosure.
Figure 7:
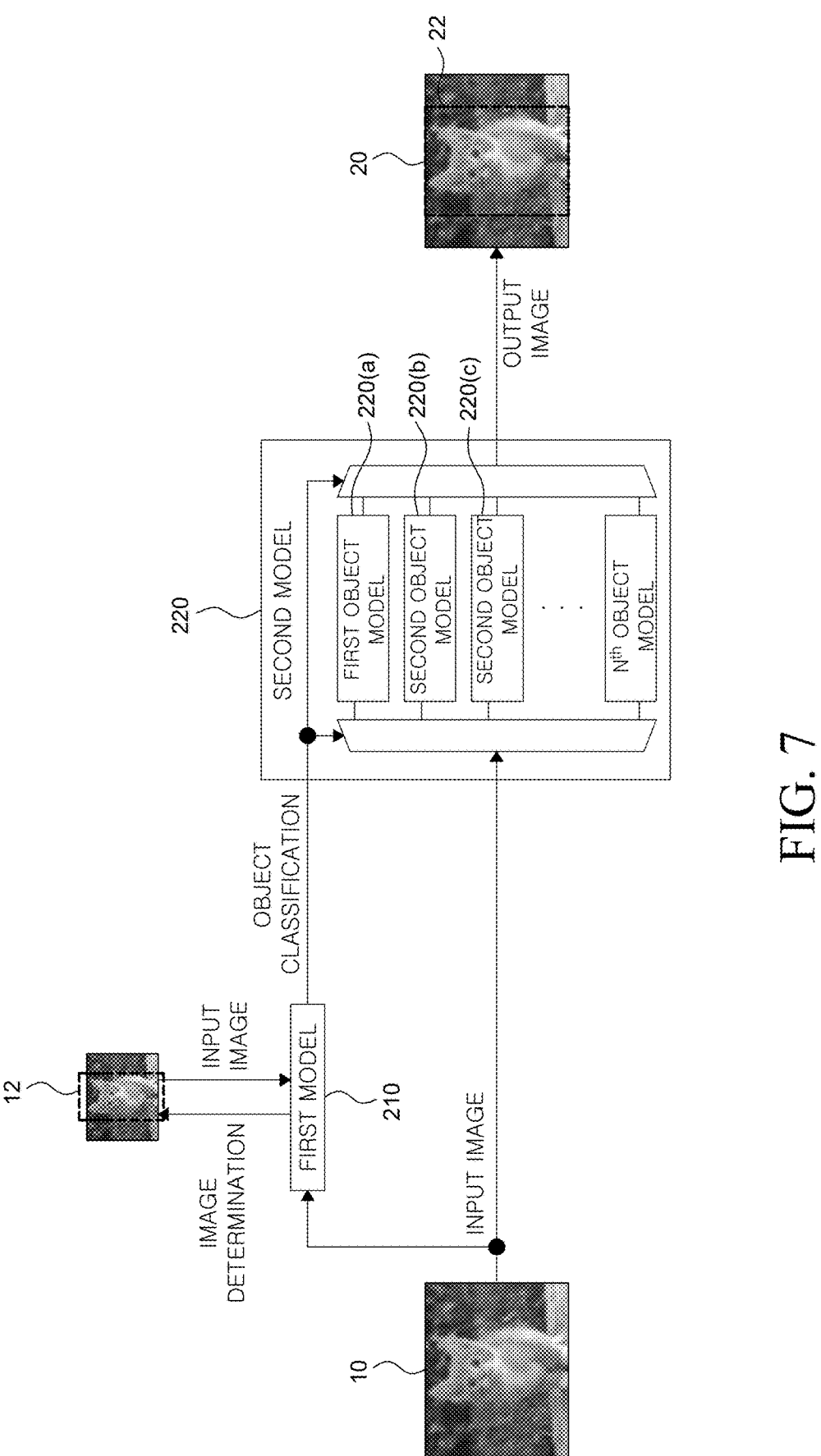

FIG. 5 illustrates an image processing method based on a neural processing unit according to an example of the present disclosure. FIGS. 6 and 7 respectively illustrate procedures to output an image with improved quality using a first model and a second model in a neural processing unit according to an example of the present disclosure. FIGS. 8A to 8D illustrate the structure of a second model in a neural processing unit according to examples of the present disclosure.

First, referring to FIG. 5, an image including an object is received (S510). Next, the object is classified in the image by the first model (S520). Then, an image of improved quality is obtained according to the classified object by using one selected model among the plurality of second models (S530). Then, an image of improved quality is provided (S540).

First, in the step S510, an image including an object corresponding to a category such as food, weather, animal, insect, landscape, nature, sports, clothing, person, emotion, program, and means of transportation may be received. Here, there may be at least one object.

That is, in the step S510, categories for which the image is to be improved may be predetermined. In this case, the object in the image may be matched to a plurality of categories. That is, one entity may correspond to two categories.

Next, in the step S520, the object is classified in the image by the first model. The object may be at least one object.

More specifically, in the step S520, what the object is may be classified by the first model trained to classify the object by inputting the image as an input. The first model may be a model trained to classify an object corresponding to a preset category. Accordingly, a parameter of the first model, for example, a trained weight, may be a weight trained to classify at least one of a plurality of categories corresponding to an object.

According to the present disclosure, after the step S520, a step of determining a category for the classified object may be further performed. However, it is not limited thereto, and the category of the image input by the first model may be directly determined.

That is, the first model may include an output layer including a plurality of nodes corresponding to the name of an object or a corresponding category of the object together with the input layer to which the image is input.

For example, referring to FIG. 6, a cat image 10 matching the animal category received in the step S510 is received. In the step S520, the image 10 is input to the first model 210. As a result, the object in the image 10 may be determined as "cat" by the first model 210. Also, the category of the image 10 may be determined to be "animal" or "mammal" by the parameter trained by the first model 210.

However, the object classification procedure is not limited thereto.

For example, referring to FIG. 7, in the step S510, the received image 10 is input to the first model 210, and thereafter, a region of interest (ROI) 12 corresponding to the object region is divided. After that, the ROI 12 may be input to the first model 210 again, and objects may be classified with respect to the divided ROI 12. That is, the first model 210 may be configured of a region dividing unit that divides regions by receiving an image and a classifier configured to classify objects by receiving an image (or region) as an input.

The ROI 12 may be rectangular. However, the present invention is not limited thereto, and may be a triangle, a pentagon, a hexagon, a polygon, a circle, an oval, or the like.

In this case, the determination of the ROI 12 that is the region of the object may be performed based on user gaze data received from the head mount display (HMD) device. For example, a region in which the user's gaze stays for a longer time than other regions may be determined as the ROI.

Referring back to FIG. 5, in the step S530, an image of improved quality according to an object is obtained by using at least one model among the plurality of second models.

More specifically, in the step S530, at least one model among the plurality of second models may be determined, and an image of improved quality according to an object may be generated (outputted) by the second model.

For example, referring to FIG. 6, in the step S530, at least one of the plurality of second models 220 including the first object model 220(*a*), the second object model 220(*b*), the third object model 220(*c*), . . . is determined according to the object classified by the first model 210. Next, after the image 10 is input to the at least one determined model, the image processed image 20 in the determined at least one model is output. Accordingly, the improved image in quality 20 according to the object or the category of the object may be obtained. In this case, the selection of the second model 220 corresponding to the object among the plurality of models may not be executed as a separate step, but may be automatically performed by a selection module (not shown).

According to the present disclosure, the second model may be a plurality of models configured to receive an image corresponding to each of a plurality of categories as input and to output an image to which specialized processing is applied according to the plurality of categories.

Figure 8A:
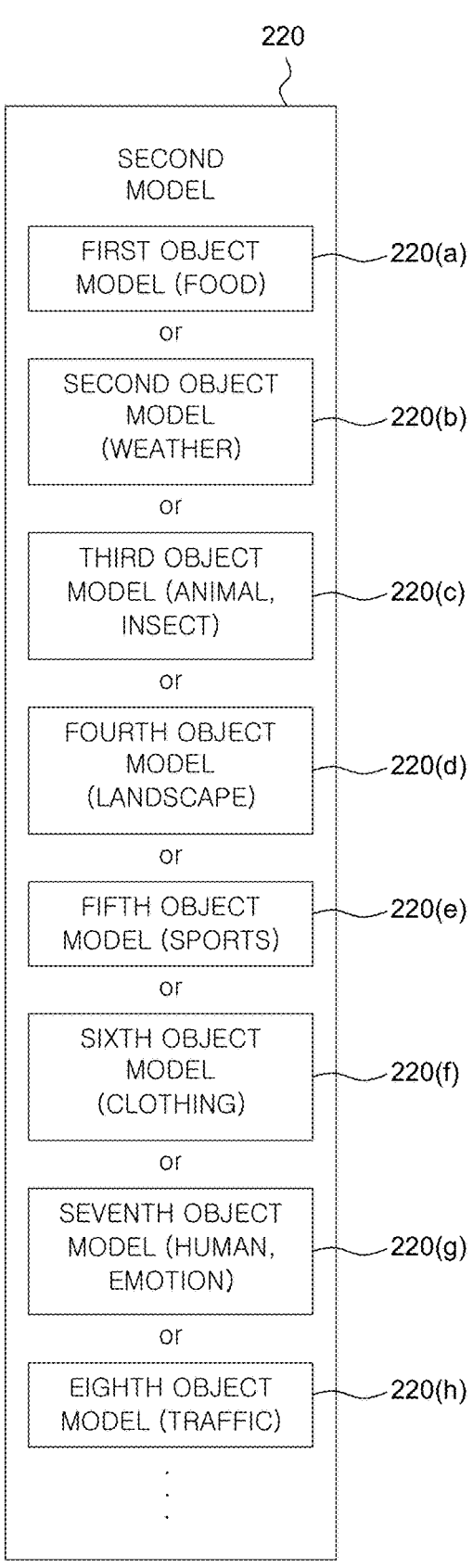
FIGS. 8A to 8D are schematic conceptual diagrams illustrating the structure of a second model in a neural processing unit according to examples of the present disclosure.

For example, further referring to FIG. 8A the second model 220 may be a plurality of models trained to output an image of improved quality that is specialized according to the category of the image of the first object model 220(*a*) trained to provide an image of improved quality for the food image, the second object model 220(*b*) trained to provide an image of improved quality for the weather image, the third object model 220(*c*) trained to provide images of improved quality for animal and insect images, the fourth object model 220(*d*) trained to provide an image of improved quality for a landscape image, the fifth object model 220(*e*) trained to provide an image of improved quality for a sports image, the sixth object model 220(*f*) trained to provide an image of improved quality for an image of clothing, the seventh object model 220(*g*) trained to provide an image of improved quality for human and emotional images, and the eighth object model 220(*h*) trained to provide an image of improved quality for a traffic image. Each model has specialized weights, that is, parameters.

For example, in the case of the first object model 220(*a*) trained to provide an image of improved quality for the food image, it may be a model trained to improve saturation, improve sharpness, and modifying color temperature for an image to be warm or cold depending on the type of food.

According to the present disclosure, the second model may be at least one image processing model among a denoising model, a deblurring model, an edge enhancement model, a demosaicing model, a color tone enhancing model, a white balancing model, a super resolution model, a wide dynamic range model, a high dynamic range model, and a decompression model.

Figure 8B:
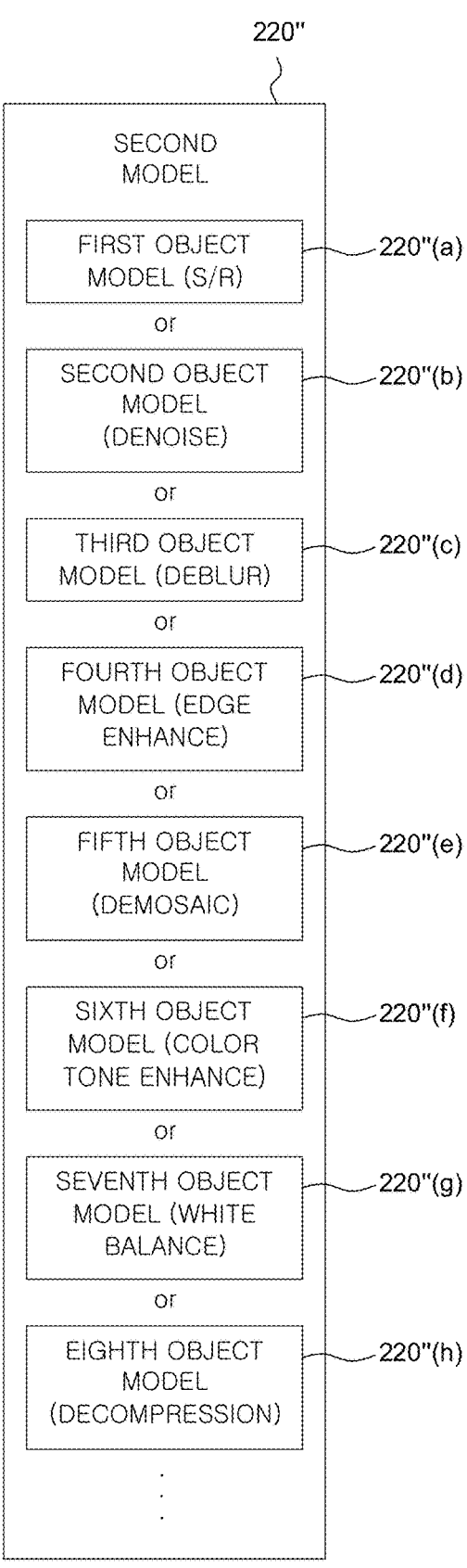

For example, referring to FIG. 8B, the second model 220" may be a plurality of models trained to perform different processes on the image of a first object model 220"(*a*) that provides super-resolution (S/R) processing for the input image, a second object model 220"(*b*) trained to provide denoising, that is, denoising processing, for the input image, a third object model 220"(*c*) trained to provide a deblurring process that removes the blurring phenomenon on the input image, a fourth object model 220"(*d*) trained to provide edge enhancement processing for the input image, a fifth object model 220"(*e*) trained to provide a demosaicing process for the input image, a sixth object model 220"(*f*) trained to provide color tone enhancement processing for the input image, a seventh object model 220"(*g*) trained to provide white balancing processing for the input image, and an eighth object model 220"(*h*) trained to provide decompression processing for removing compression on the input image.

However, it is not limited thereto, and the second model may be an image processing model trained to delete or blur an unwanted specific region (e.g., a region other than the object) in the object image.

According to the present disclosure, the second model may be an ensemble model in which multiple models are combined.

Figure 8C:
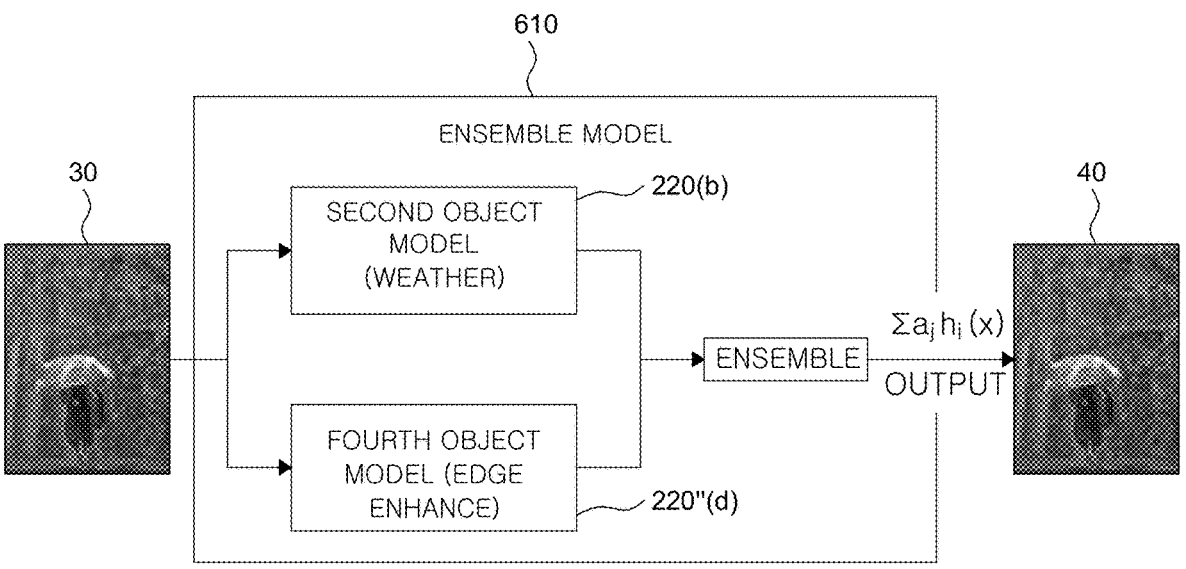

For example, referring to FIG. 8C, an image 30 classified into a "weather" category, or "rain" or "umbrella," by a first classification model (not shown) is input to the ensemble model 610. At this time, the ensemble model 610 is a model specialized according to the "weather" category or the object (or category) of "rain" and "umbrella," and may be a model in which a second object model 220(*b*) for weather and a fourth object model 220"(*d*) for edge reinforcement are connected in parallel. That is, the input image 30 is processed by each of the second object model 220(*b*) and the fourth object model 220"(*d*), and the two processed results may be ensembled to output the processed image 40. In this case, the improved image in quality 40 may be an image generated by combining pixels of object images processed by the two models.

However, it is not limited to the above-described features, and the second model may be a model in which a plurality of object models are connected in series.

Figure 8D:
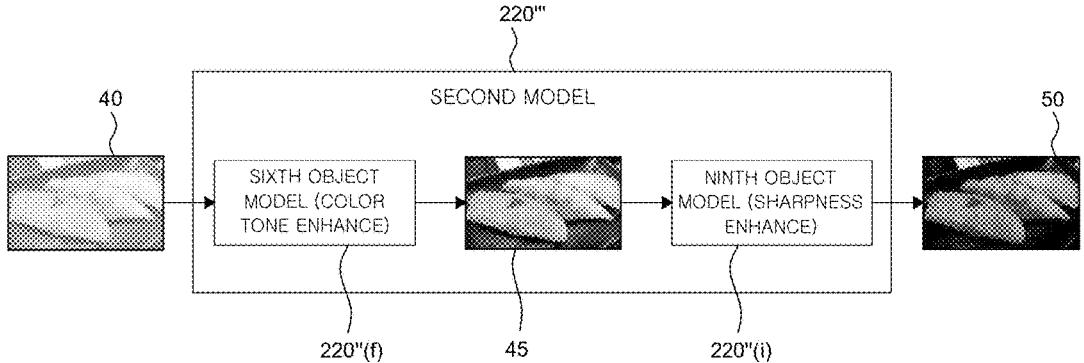

For example, referring to FIG. 8D, an image 40 classified as a "food" category or "sushi" or "Japanese food" by the first classification model (not shown) is input to the second model 220'''. At this time, the second model 220''' is a model specialized according to the "food" category or the object (or category) of "sushi" and "Japanese food," and may be a model connected in series of the sixth object model 220"(*f*) trained to improve the color tone of the input image and the ninth object model 220"(*i*) trained to improve the sharpness of the input image. That is, the input image 40 is input to the sixth object model 220"(*f*) and is output as a color tone enhanced image 45. The color tone enhanced image 45 is again input to the ninth object model 220"(*i*), so that the color tone and sharpness-enhanced image 50 may be finally output. Meanwhile, in the second model, serial connection of object models may be variously selected in a combination or order according to the type of object or the category of the object aimed at improving the quality.

However, it is not limited thereto, and in the step S530, an image of improved quality may be generated with respect to a predetermined object region.

For example, referring to FIG. 7, in the step S530, at least one of the plurality of second models 220 including the first object model 220(*a*), the second object model 220(*b*), and the third object model 220(*c*), . . . is determined according to the results classified by the first model 210 for the ROI 12. Next, after the image 10 is input to at least one model, the image 20 on which the image is processed is output. In this case, the image 20 of improved quality may include an object region 22 in which the image is processed with respect to the ROI 12, that is, the quality is improved. In other words, quality improvement may be performed only on the object region 12 in the image 10 by the second model 220.

Referring back to FIG. 5, in the step S540, an image of improved quality is provided. That is, in the step S540, an image with an optimal quality may be provided according to an object (or a category thereof).

That is, the image processing method according to the present disclosure may provide an image having an optimal quality according to characteristics of an object by using a plurality of independent neural network-based models of a model trained to classify objects within an image and a model trained to process images according to the classified object.

Meanwhile, the second model according to various disclosures is a single model, and at least one parameter among a plurality of parameters preset according to the characteristics of the object may be applied, thereby it may be possible to provide an image with improved quality according to the characteristics of the object. Here, the single model may mean a model in which the layer structure of the artificial neural network, the number of channels, the size of input data, and the size of output data are the same. In more detail, when only the trained weights of the single model are replaced, the single model can perform a specific image processing function according to the replaced parameters.

Hereinafter, an image processing method according to various embodiments of the present disclosure will be described with reference to FIGS. 9 to 11.

FIG. 9 illustrates an image processing method based on a neural processing unit according to another example of the present disclosure. FIGS. 10 and 11 respectively illustrate procedures to output an image in which an image is processed using a first model and a second model in a neural processing unit according to another example of the present disclosure.

First, referring to FIG. 9, for image processing based on a neural processing unit according to another example of the present disclosure, an image including an object having one selected category among a plurality of categories is received (S910). Then, the object is classified in the image by the first model (S920). Next, the category of the object is determined (S930). Then, the parameter corresponding to the category of the object is applied to the second model (S940). Then, an image of improved quality is obtained according to the category of the object by the second model (S950). Finally, an image of improved quality is provided (S960).

On the other hand, the steps S910 and S920 may be performed in the same manner as the steps S510 and S520 described above with respect to FIGS. 5, 6, and 7.

In the step S930, the category of the classified object is determined through the step S920.

Next, in the step S940, a parameter predetermined according to the category of the object may be applied to the second model.

According to an example of the present disclosure, the step S940 may be performed by a parameter selection module including a plurality of object parameters.

Figure 10:
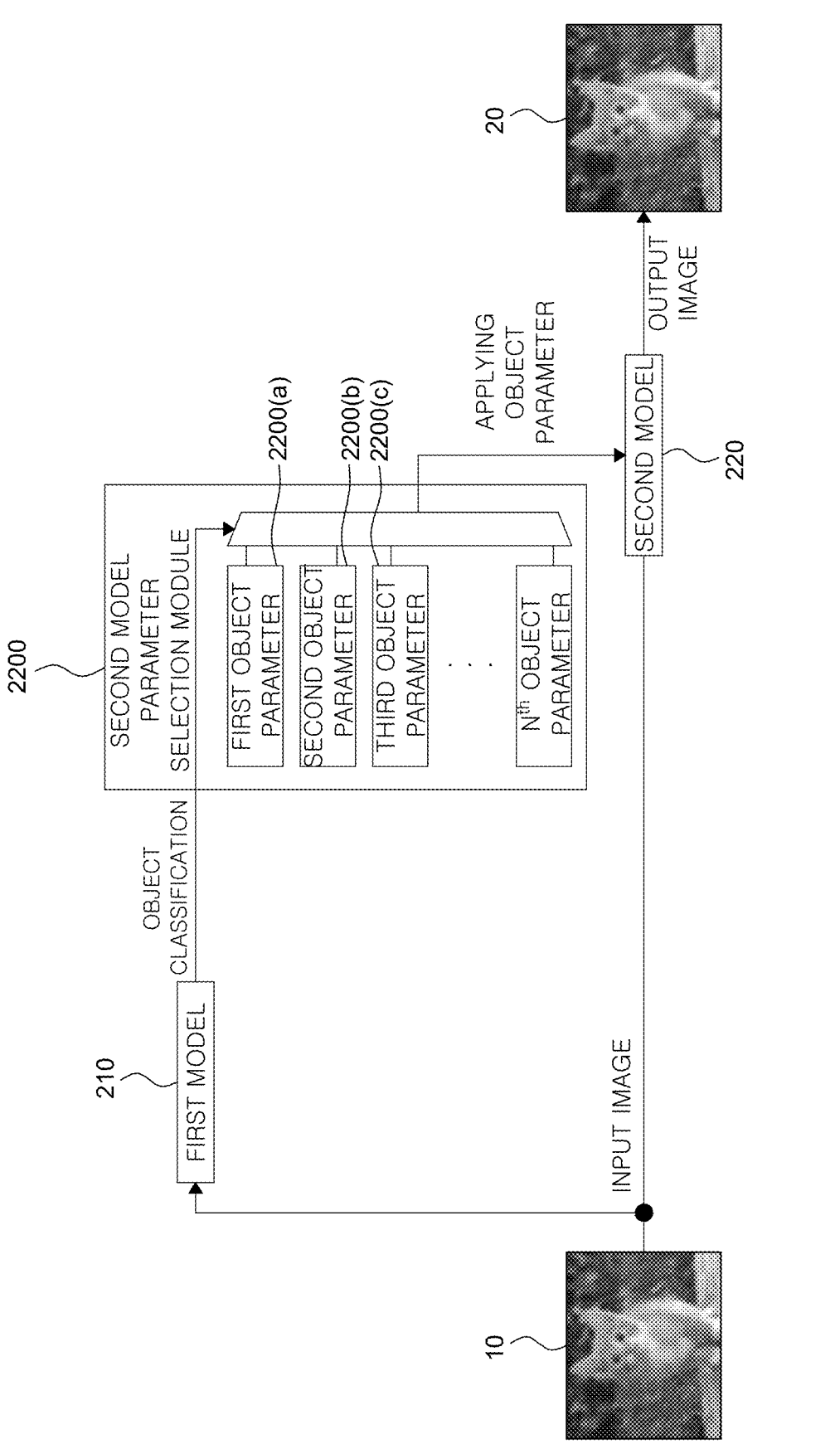
FIGS. 10 and 11 are exemplary schematic diagrams respectively illustrating procedures to output an image with improved quality using a first model and a second model in a neural processing unit according to another example of the present disclosure.
Figure 11:
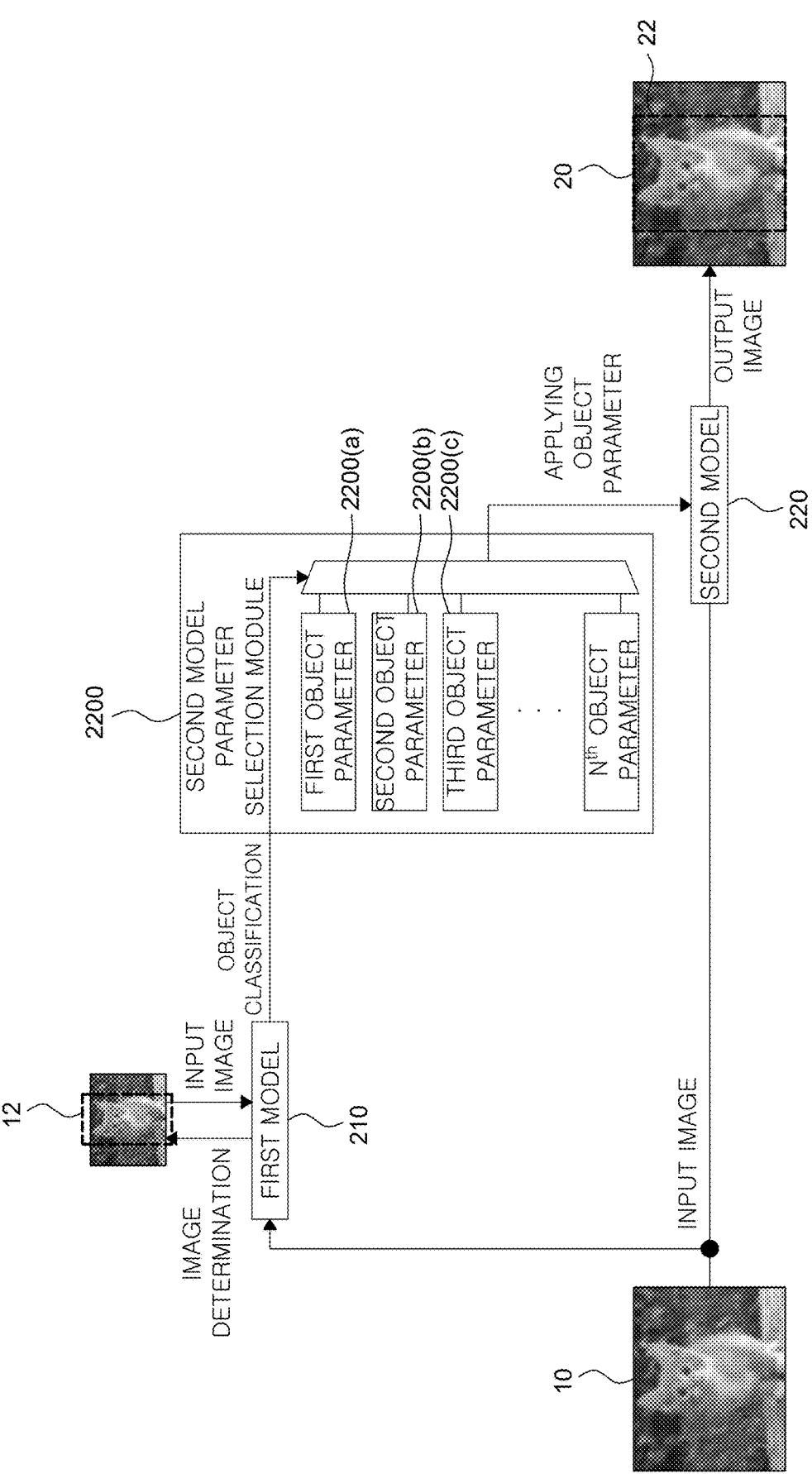

For example, referring to FIGS. 10 and 11 together, in the step S940, at least one parameter among the first object parameter 2200($a$), the second object parameter 2200($b$), the third object parameter 2200($c$), . . . may be determined according to the category of image 10 or ROI 12. In this case, the parameter may be automatically set according to the category of the classified object by the second model parameter selection module 2200. Then, the object parameter determined by the second model parameter selection module 2200 may be applied to the second model 220.

Referring back to FIG. 9, in the step S950, an image of improved quality is obtained by the two models, and in the step S960, an improved image in quality is provided. At this time, descriptions of the steps S950 and S960, which may be performed in the same procedure as the steps S530 and S540 described above with respect to FIGS. 5, 6, and 7, will be omitted.

That is, in the image processing method according to the present disclosure, object parameters of predetermined trained parameters can be variously applied according to objects with respect to a single second model, so that an image with improved quality by reflecting the characteristics of the object can be provided.

Hereinafter, a license plate recognition system based on a neural processing unit according to various examples of the present disclosure will be described with reference to FIG. 12.

Figure 12:
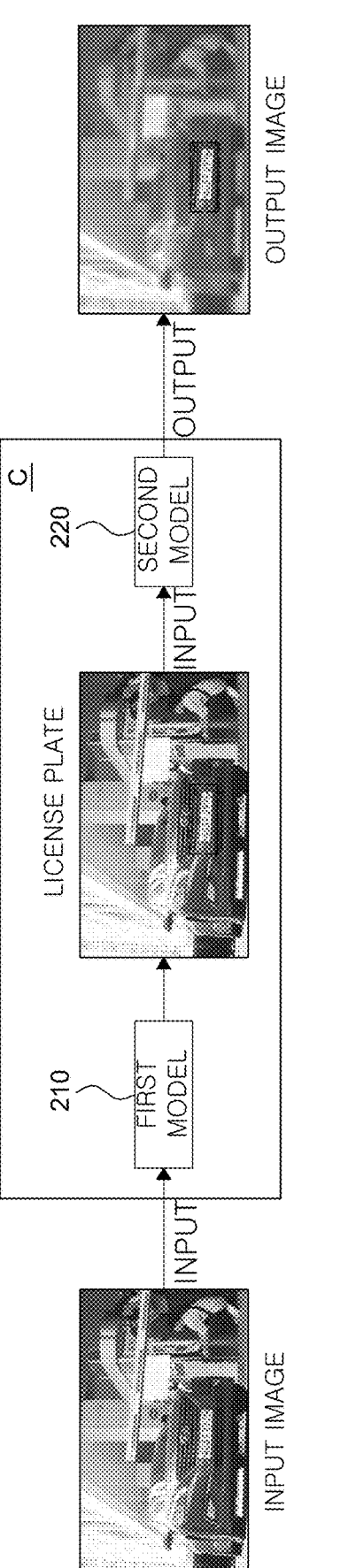
FIG. 12 is an exemplary diagram of a neural processing unit-based license plate recognition system according to an example of the present disclosure.

FIG. 12 illustrates a neural processing unit-based license plate recognition system according to an example of the present disclosure.

Referring to FIG. 12, in the neural processing unit-based license plate recognition system C, a vehicle image is input to the first model 210, and an object in the image may be classified as "license plate." However, it is not limited thereto, and the first model 210 may be configured to classify the vehicle image into "car," "number," and the like according to the purpose of using the image. In this case, object classification, that is, classification into license plates, may be performed after the object image is determined. Then, the image in which an object (or a category) is classified may be input to the second model 220 corresponding to the object, and an image in which only the license plate area is emphasized may be output. At this time, the second model may be a specialized model for license plate recognition that has been trained to not only emphasize the license plate area, but also delete or blur the area where other privacy issues will occur.

That is, the neural processing unit-based license plate recognition system C may be designed to modulate or delete certain unwanted information.

Hereinafter, an implementation form of an image processing method according to various examples of the present disclosure will be described with reference to FIGS. 13A-13C.

Figure 13A:
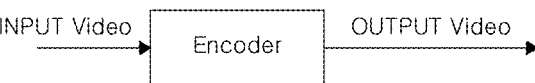
FIGS. 13A to 13C are implementation diagrams of an image processing method according to various examples of the present disclosure.
Figure 13B:
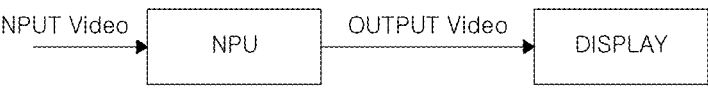
Figure 13C:
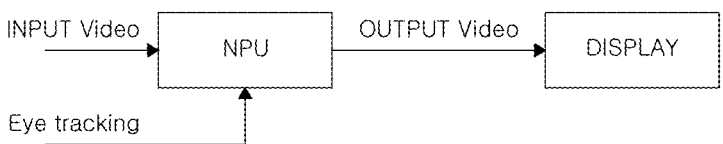

FIGS. 13A-13C illustrate an image processing method according to various examples of the present disclosure.

More specifically, referring to FIG. 13A, the image processing method according to the present disclosure may be implemented as software of an encoder. That is, when a video file is input to the encoder, an image-processed video file may be output. In this case, the input data may be a video file (a file having an extension such as AVI, MOV, etc.) or an image file (a file having an extension such as RGB, JPEG, JPG, etc.), but is not limited thereto.

Referring to FIG. 13B, the image processing method according to the present disclosure may be implemented as a television. More specifically, in the system board of a television including the NPU, when a video file is input to the NPU, the image-processed video file is output, and the image-processed video may be displayed on the display. In this case, the input data may be a video file (a file having an extension such as AVI, MOV, etc.) or an image file (a file having an extension such as RGB, JPEG, JPG, etc.), but is not limited thereto.

Referring to FIG. 13C, the image processing method according to the present disclosure may be implemented as an augmented reality/virtual reality (AR/VR) system. More specifically, when eye tracking information is input together with a video file to the provided NPU, an image-processed video file is output, and the image-processed video can be displayed on a display.

According to this implementation method, the amount of computation may be reduced with low computational power and the like.

The image processing method according to an example of the present disclosure may include a step of receiving an image including an object, a step of classifying at least one object in the image using a first model on the basis of artificial neural network configured to classify the at least one object by inputting the image, and a step of obtaining an improved image in quality according to the at least one object by inputting the image in which the at least one object is classified by using at least one model among a plurality of second models on the basis of artificial neural network configured to output a specialized processing applied image according to a particular object by inputting the image.

At least one object may be an object having one category selected from among a plurality of categories, the plurality of second models may be a plurality of models configured to input an image corresponding to each of the plurality of categories and output the applied image of specialized processing according to the plurality of categories. At this point, the method may further include a step of determining a category of the at least one object after classifying the at least one object. Further the step of obtaining the improved image in quality may further include a step of obtaining the improved image in quality by using one of the plurality of second models corresponding to the category of the at least one object.

The first model is configured to output a region of the at least one object by inputting the image, and the processing method may further include a step of determining the region of the at least one object in the image by using the first model after the receiving step. At this point, the step of classifying the at least one object may include a step of classifying the at least one object based on the region of the at least one object using the first model.

The step of obtaining the improved image in quality may include a step of obtaining the improved image in quality of the region of the at least one object by using the second models.

The processing method may further include a step of receiving a gaze data from a head mount display (HMD) device. At this point, the step of determining the region of the at least one object may further include a step of determining the region of the at least one object based on the gaze data.

The first model may include an input layer and an output layer configured of a plurality of nodes. A number of the second models may correspond to the number of nodes of the output layer of the first model.

At least one model may be at least one of a denoising model, a deblurring model, an edge enhancement model, a demosaicing model, a color tone enhancing model, a white balancing model, a super resolution model, a wide dynamic range model, a high dynamic range model, and a decompression model.

At least one model may be an ensemble model in which at least two models selected from among the plurality of second models are combined.

The method may include steps of receiving an image including an object having one category selected from among a plurality of categories, determining the category of the object in the image by using a first model on the basis of artificial neural network configured to classify the object by inputting the image, and applying a parameter corresponding to the category of the classified object from among a plurality of parameters predetermined for each of the plurality of categories to a second model on the basis of artificial neural network configured to output a specialized processing applied image according to the object by inputting the image, and obtaining an improved image in quality according to the category of the object by inputting the image whose category is determined by using the second model to which the corresponding parameter is applied.

The processing unit may include an internal memory configured to store an image comprising an object, a first model and a second model, and a processing element (PE) configured to access the internal memory and configured to process convolution of the first model and the second model, and a controller operatively coupled to the internal memory and the processing element. At this point. the first model may be an artificial neural network-based model configured to classify the object by inputting the image, and the second model may be a plurality of artificial neural network-based models configured to output a specialized processing applied image according to the object by inputting the image. Further, the controller may be configured to induce the PE to classify the object in the image using the first model, and obtain an improved image in quality according to the object based on the image in which the object is classified by using at least one model among the plurality of models of the second model.

The processing unit may further include a main memory configured to store the first model and the second model. At this point, the internal memory may be configured to read the first model and the second model in the main memory.

The object may be an object having one category selected from among a plurality of categories, and the second model may be the plurality of models configured to output a processed image of a predetermined process corresponding to each of the plurality of categories by inputting the image corresponding to each of the plurality of categories. At this point, the controller may be configured to induce the PE to determine the category of the object, and obtain the improved image in quality by using one of the plurality of models of the second model corresponding to the category of the object.

A selection module configured to select at least one model among the plurality of models of the second model may be further included.

The first model may be further configured to output a region of the object by inputting the image. The controller may be further configured to induce the PE to determine a region of the object in the image using the first model, and classify the object based on the region of the object using the first model.

The controller may be further configured to induce the PE to obtain the improved image in quality of the region of the object by using the second model.

The internal memory may further store a gaze data from a head mount display (HMD) device, and the controller may be further configured to induce the PE to determine the region of the object based on the gaze data.

The first model may include an input layer and an output layer configured of a plurality of nodes, and a number of the second model may corresponds to the number of nodes of the output layer of the first model.

At least one model may be at least one of a denoising model, a deblurring model, an edge enhancement model, a demosaicing model, a color tone enhancing model, a white balancing model, a super resolution model, a wide dynamic range model, a high dynamic range model, and a decompression model.

At least one model may be an ensemble model in which at least two models selected from among the plurality of second models are combined.

It may be further configured to combine the regions processed by each of the second models to output the improved image in quality.

Each of the first model and the second model may include a parameter. At this point, the internal memory may be configured to read the parameter of the first model or the parameter of the second model tiled to a predetermined size from the main memory, based on a capacity of the internal memory.

Each of the first model and the second model includes a parameter, and the internal memory may be configured to include the parameter of the first model, and optionally read the parameter of the second model from the main memory.

The second model includes a parameter, the image is a plurality of images, and the internal memory may include the parameter of the second model corresponding to a classification result of the object of a previous image when the classification result of the object for a selected image among the plurality of images by the first model is the same as the classification result of the object for the previous image.

The processing unit includes an internal memory configured to store an image including an object having one category selected from among a plurality of categories, a first model and a second model; a processing element (PE) configured to access the internal memory and configured to process convolution of the first model and the second model; and a controller operatively coupled to the internal memory and the processing element. At this point, the first model is an artificial neural network-based model configured to classify the object by inputting the image, and the second model is an artificial neural network-based models configured to output a specialized processing applied image according to the object by inputting the image. Further, the controller may induce the PE to classify the object in the image using the first model. It may be configured to apply a parameter corresponding to the category of the classified object from among a plurality of parameters predetermined for each of the classified objects to the second model, and obtain an improved image in quality according to the category of the object by inputting the image in which the category is classified using the second model to which the corresponding parameter is applied.

A selection module configured to select the plurality of parameters may be further included.

The image processing method includes a step of receiving an input image; a step of classifying at least one object of the input image; a step of applying an artificial neural network model corresponding to the classified object; and a step of image processing the input image with the selected artificial neural network model.

The step of classifying of the at least one object of the input image may be performed by a first model trained to classify the at least one object of the input image.

A first model may be trained to determine a region of the at least one object.

A method of determining the region of at least one object may be object detection or semantic segmentation.

The step of applying the model corresponding to the classified object may be performed by the selection module of the second model.

The second model may include a plurality of object models corresponding to the number of object classifications of the first model. Each object model may be an object image processing model trained by a training dataset in which a specific image processing is applied to a specific object.

An artificial neural network image processing method, wherein the second model includes object parameters corresponding to the number of object classifications of the first model.

The apparatus may include: a first model trained to classify at least one object of an input image; and a second model trained to perform image processing corresponding to the classification of the at least one object.

The apparatus may further comprise a neural processing unit configured to process the first model and the second model.

The apparatus may be configured to set a region of interest (ROI) of the input image, and the image processing may be configured to process at least super resolution in the ROI.

The second model may be trained to image process at least one of denoising, deblurring, edge enhancement model, demosaicing, color tone enhancing, white balancing, super resolution, super resolution, and decompression.

The neural processing unit may include: an NPU internal memory configured to store at least a portion of at least one of the first model and the second model; and an array of processing elements in communication with the NPU internal memory and configured to process the convolution of at least one of the first model and the second model.

The apparatus further comprises a main memory configured to store the first model and the second model, the NPU internal memory may optionally be configured to read the first model and the second model from the main memory.

The neural processing unit may be configured to utilize the first model to perform an object recognition operation.

The neural processing unit may be configured to utilize the second model to perform an image processing operation.

The at least one processing element may be configured to process object image processing models of the second model corresponding to the number of objects classified in the first model.

The neural processing unit may be configured to generate an image-processed output image by combining image-processed regions in each of the object image processing models.

Based on the memory size of the NPU internal memory, the NPU internal memory may be configured to receive at least a portion of each parameter of the first model and the second model tiled to a specific size from the main memory.

At least a portion of the parameters of the first model resides in the NPU internal memory, and at least a portion of the parameters of the second model corresponding to the object recognition result of the first model among the parameters of the second model can be switched to the NPU internal memory.

When the object recognition result of the first model is the same as the previous frame, at least some of the parameters of the second model may reside in the NPU internal memory.

Examples of the present disclosure published in the present specification and drawings are merely specific examples to easily explain the technical content of the present disclosure and help the understanding of the present disclosure, and are not intended to limit the scope of the present disclosure. It will be apparent to those of ordinary skill in the art to which the present disclosure pertains that other modified examples based on the technical spirit of the invention can be implemented in addition to the examples described herein.

[National R&D project supporting this invention]
[Project unique number] 1711126253
[task number] 2020-0-01297-002
[Name of Ministry] Ministry of Science and ICT
[Name of task management (specialized) institution] Information and Communication Planning and Evaluation Institute
[Research project name] Next-generation intelligent semiconductor technology development (design) (R&D)
[Research Title] Deep Learning Processor for Advanced Data Reuse and Ultra-Low Power Edge technology development
[Contribution rate] 1/1
[Name of project performing organization] DeepX Co., Ltd.
[Research period] 2021 Jan. 1~2021 Dec. 31

What is claimed is:

1. An image processing method comprising:
receiving a first image including at least one object;
receiving, from a head-mounted display (HMD) device, data indicative of a gaze of a user viewing the first image;
determining a region of the at least one object by inputting the first image to a first model based on an artificial neural network trained to classify an object corresponding to a predetermined category;
determining, based on the received gaze data, a region in which the gaze of the user stays relatively long among regions of each of the at least one object as a region of interest (ROI) by using the first model;
classifying a category of each of the at least one object by re-inputting each determined ROI to the first model;
determining at least one second model among a plurality of second models based on an artificial neural network trained to output an image to which a category-specific image processing corresponding to an object category is applied by inputting the first image to the at least one second model, the determined at least one second model corresponding to the category of each of the at least one object; and
outputting a second image having improved quality by using the at least one second model such that an ROI-specific image processing corresponding to an object category of each determined ROI is applied to the first image.

2. The image processing method of claim 1, wherein the at least one object includes an object belonging to one category selected from among a plurality of categories.

3. The image processing method of claim 1, wherein the first model includes an input layer and an output layer comprising a plurality of nodes, and wherein the number of the plurality of second models corresponds to the number of the plurality of nodes of the output layer of the first model.

4. The image processing method of claim 1, wherein the at least one second model includes at least one of a denoising model, a deblurring model, an edge enhancement model, a demosaicing model, a color tone enhancing model, a white balancing model, a super resolution model, a wide dynamic range model, a high dynamic range model, and a decompression model.

5. The image processing method of claim 1, wherein the at least one second model includes an ensemble model in which at least two second models selected from among the plurality of second models are combined and are connected in parallel or in series, and wherein the second image is output from one of the parallel connection and the series connection.

6. An image processing method comprising:
receiving a first image including at least one object, the at least one object including an object belonging to one category selected from among a plurality of categories;
receiving, from a head-mounted display (HMD) device, data indicative of a gaze of a user viewing the first image;
determining a region of the at least one object by inputting the first image to a first model based on an artificial neural network trained to classify an object corresponding to a predetermined category;
determining, based on the received gaze data, a region in which the gaze of the user stays relatively long among regions of each of the at least one object as a region of interest (ROI) by using the first model;
classifying a category of each of the at least one object by re-inputting each determined ROI to the first model;
applying a parameter among a plurality of parameters predetermined for each of the plurality of categories to a second model based on an artificial neural network trained to output an image to which a category-specific image processing corresponding to an object category is applied by inputting the first image to the second model, the applied parameter corresponding to the category of each of the at least one object; and
outputting a second image having improved quality by using the second model such that an ROI-specific image processing corresponding to an object category of each determined ROI is applied to the first image.

7. A neural processing unit comprising:
an internal memory configured to store a first model, at least one second model, and at least part of data of a first image, the first image including at least one object and a region of interest (ROI) determined based on gaze data acquired from a head-mounted display (HMD) device, the gaze data indicative of a gaze of a user viewing the first image;
a processing element (PE) array configured to access the internal memory and to process convolution of the first model and the at least one second model; and
a controller operatively coupled to the internal memory and the processing element,
wherein the first model includes an artificial neural network-based model trained to determine a region of the at least one object by inputting the first image to the first model and to classify an object corresponding to a predetermined category,
wherein the at least one second model includes a plurality of artificial neural network-based models respectively trained to output an image to which a category-specific image processing corresponding to an object category is applied by inputting the first image to the at least one second model, and
wherein the controller is configured to induce the PE array to determine, as the ROI, a region in which the gaze of the user stays relatively long among regions of each of the at least one object, the ROI determined based on the gaze data by using the first model, re-input each determined ROI to the first model to classify a category of each of the at least one object, and output a second image having improved quality by using a second model corresponding to the category of each of the at least one object among the plurality of second models such that an ROI-specific image processing corresponding to an object category of each determined ROI is applied to the first image.

8. The neural processing unit of claim 7, further comprising:

a main memory configured to store the first model and the at least one second model, wherein the internal memory is further configured to read the first model and the at least one second model stored in the main memory.

9. The neural processing unit of claim 8, wherein each of the first model and the at least one second model includes a parameter, and wherein the internal memory is further configured to read, from the main memory, the parameter of the first model or the parameter of the at least one second model, the parameter being tiled to a predetermined size based on a capacity of the internal memory.

10. The neural processing unit of claim 8, wherein each of the first model and the at least one second model includes a parameter, and wherein the internal memory is further configured to store the parameter of the first model, and optionally read the parameter of the at least one second model from the main memory.

11. The neural processing unit of claim 7, wherein the at least one object belongs to one category selected from among a plurality of categories.

12. The neural processing unit of claim 7, wherein the first model includes an input layer and an output layer comprising a plurality of nodes, and wherein the number of the plurality of second models corresponds to the number of the plurality of nodes of the output layer of the first model.

13. The neural processing unit of claim 7, wherein the at least one second model includes at least one of a denoising model, a deblurring model, an edge enhancement model, a demosaicing model, a color tone enhancing model, a white balancing model, a super resolution model, a wide dynamic range model, a high dynamic range model, and a decompression model.

14. The neural processing unit of claim 7, wherein the at least one second model includes an ensemble model in which at least two second models selected from among the plurality of second models are combined and are connected in parallel or in series, and wherein the second image is output from one of the parallel connection and the series connection.

15. The neural processing unit of claim 7, wherein the controller is further configured to combine regions processed by each of the at least one second model to output the second image having improved quality.

16. The neural processing unit of claim 7, wherein the at least one second model includes a parameter, wherein the internal memory is further configured to store the parameter of the at least one second mode and a plurality of images including the first image, and wherein the parameter stored in the internal memory corresponds to a classification result of an object for a previous image when a classification result of an object for a selected image among the plurality of images by the first model is the same as the classification result of the object for the previous image.

17. A neural processing unit comprising:

an internal memory configured to store a first model, at least one second model, and at least part of data of a first image, the first image including at least one object belonging to one category selected from among a plurality of categories and a region of interest (ROI) determined based on gaze data acquired from a head-mounted display (HMD) device, the gaze data indicative of a gaze of a user viewing the first image;

a processing element (PE) array configured to access the internal memory and to process convolution of the first model and the at least one second model; and a controller operatively coupled to the internal memory and the processing element, wherein the first model includes a plurality of artificial neural network-based model trained to determine a region of the at least one object by inputting the first image to the first model and to classify an object corresponding to a predetermined category, wherein the at least one second model includes a plurality of artificial neural network-based models respectively trained to output an image to which a category-specific image processing corresponding to an object category is applied by inputting the first image to the at least one second model, and wherein the controller is configured to induce the PE array to determine, as the ROI, a region in which the gaze of the user stays relatively long among regions of each of the at least one object, the ROI determined based on the gaze data by using the first model, re-input each determined ROI to the first model to classify a category of each of the at least one object, and output a second image having improved quality by applying a parameter corresponding to the category of each of the at least one object to the second model such that an ROI-specific image processing corresponding to an object category of each determined ROI is applied to the first image, the applied parameter selected from among a plurality of parameters predetermined for each of the plurality of categories.

* * * * *